US012785322B2

(12) United States Patent
Kudo

(10) Patent No.: US 12,785,322 B2
(45) Date of Patent: Nov. 3, 2026

(54) CONNECTOR INCLUDING INTERLOCK CONNECTOR HAVING MOVABLE HOUSING

(71) Applicant: SUMITOMO WIRING SYSTEMS, LTD., Mie (JP)

(72) Inventor: Yasuhiro Kudo, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 354 days.

(21) Appl. No.: 18/683,497

(22) PCT Filed: Jun. 28, 2022

(86) PCT No.: PCT/JP2022/025671
§ 371 (c)(1),
(2) Date: Feb. 13, 2024

(87) PCT Pub. No.: WO2023/026679
PCT Pub. Date: Mar. 2, 2023

(65) Prior Publication Data

US 2024/0356275 A1 Oct. 24, 2024

(30) Foreign Application Priority Data

Aug. 25, 2021 (JP) ................................ 2021-137381

(51) Int. Cl.
*H01R 13/533* (2006.01)
*H01R 13/502* (2006.01)
(Continued)

(52) U.S. Cl.
CPC ......... *H01R 13/533* (2013.01); *H01R 13/502* (2013.01); *H01R 13/6581* (2013.01); *H01R 13/748* (2013.01); *H01R 2201/26* (2013.01)

(58) Field of Classification Search
CPC ........................... H01R 13/533; H01R 13/502; H01R 13/6581; H01R 13/748; H01R 2201/26
See application file for complete search history.

(56) References Cited

U.S. PATENT DOCUMENTS 8,579,655 B2 * 11/2013 Kawamura ........ H01R 13/6315 439/353
9,376,069 B2 * 6/2016 Nakai ............... H01R 13/5219
(Continued)

FOREIGN PATENT DOCUMENTS

JP 2017-045572 A 3/2017
JP 2017-126512 A 7/2017
(Continued)

OTHER PUBLICATIONS

International Search Report issued on Aug. 9, 2022 for WO 2023/026679 A1 (4 pages).

*Primary Examiner* — Thanh Tam T Le
(74) *Attorney, Agent, or Firm* — Venjuris, P.C.

(57) ABSTRACT

A connector according to one aspect of the present disclosure is provided with two connection terminals, two wires, a connector housing, a cover and an interlock connector. The cover (70) includes a cover terminal (92) and an accommodating portion (91), in which the cover terminal (92) is to be arranged. The interlock connector (200) includes two first terminals (210), two second terminals (220), two flexible wires (230), a first housing (240), a second housing (250) and a holder (260). The holder 260 holds each of the first housing (240) and the second housing (250) movably in a plane direction. Each of the two flexible wires (230) includes an extra length portion allowing movements of the first housing (240) and the second housing (250) in the plane direction. The connector housing includes a fixing portion for fixing the holder (260) inside the tubular portion (31).

8 Claims, 17 Drawing Sheets

(51) Int. Cl.
*H01R 13/6581* (2011.01)
*H01R 13/74* (2006.01)

(56) References Cited

U.S. PATENT DOCUMENTS

| | | | | |
|---|---|---|---|---|
| 10,128,605 | B2 * | 11/2018 | Takeuchi | H01R 13/6315 |
| 11,336,051 | B1 * | 5/2022 | Tyler | H01R 13/5202 |
| 11,476,615 | B2 * | 10/2022 | Suzuki | H01R 13/5808 |
| 11,545,782 | B2 * | 1/2023 | Okayasu | H01R 13/6596 |
| 11,569,604 | B2 * | 1/2023 | Kobayashi | H01R 13/44 |
| 11,769,960 | B2 * | 9/2023 | Masuda | H01R 13/5202 439/345 |
| 11,804,663 | B2 * | 10/2023 | Kitaoka | H01R 4/30 |
| 11,955,751 | B2 * | 4/2024 | Nishijima | H01R 13/6582 |
| 12,142,870 | B2 * | 11/2024 | Kudo | H01R 13/405 |
| 2012/0282789 | A1 | 11/2012 | Kawamura | |
| 2014/0127920 | A1 | 5/2014 | Tanaka et al. | |
| 2021/0313716 | A1 | 10/2021 | Hashii | |
| 2024/0380165 | A1 * | 11/2024 | Kudo | H01R 13/71 |

FOREIGN PATENT DOCUMENTS

| | | | |
|---|---|---|---|
| JP | 2017-216178 | A | 12/2017 |
| JP | 2020-004727 | A | 1/2020 |
| WO | 2019/235175 | A1 | 12/2019 |

* cited by examiner

CONNECTOR INCLUDING INTERLOCK CONNECTOR HAVING MOVABLE HOUSING

CROSS REFERENCE TO RELATED APPLICATIONS

This application is a national phase of PCT application No. PCT/JP2022/025671, filed on 28 Jun. 2022, which claims priority from Japanese patent application No. 2021-137381, filed on 25 Aug. 2021, all of which are incorporated herein by reference.

TECHNICAL FIELD

The present disclosure relates to a connector.

BACKGROUND

Patent Document 1 discloses a connector provided with a housing including an opening for exposing an end part of a wire-side terminal and a service cover (hereinafter, referred to as a cover) for covering the opening as a connector to be connected to a device for vehicle or the like.

The wire-side terminal is electrically connected to a device-side terminal provided in the device by bolt fastening through the opening of the housing. This opening is closed by the cover after the bolt fastening.

This connector constitutes an interlock circuit for electrically detecting the attachment and detachment of the cover to and from the housing and the attachment and detachment of the connector to and from the device. The interlock circuit is provided with a device-side detector provided in the device, a connector-side detector provided inside the housing and a cover-side detector provided in the cover. By connecting the device-side detector and the cover-side detector via the connector-side detector, the interlock circuit is closed. In this way, the device and the connector enter an electrically conductive state.

The device-side detector is fixed to the device. The connector-side detector is held movably in a plane direction orthogonal to a connection direction of the connector with respect to the housing. The cover-side detector is held movably in the plane direction with respect to the cover.

The cover-side detector includes two cover-side detection terminals, a wire for connecting the two cover-side detection terminals to each other and a cover-side accommodating portion for accommodating the respective cover-side detection terminals and the wire. The cover-side accommodating portion is held movably in the plane direction by a support rail provided on the cover.

In connecting such a connector to the device, the misalignment of each detector is absorbed by each of the connector-side detector and the cover-side detector moving in the plane direction.

PRIOR ART DOCUMENT

Patent Document

Patent Document 1: JP 2020-004727 A

SUMMARY OF THE INVENTION

Problems to be Solved

The cover described in Patent Document 1 is provided with the support rail for holding the cover-side accommodating portion movably in the plane direction. Thus, the configuration of the cover may be complicated.

The present disclosure aims to provide a connector capable of suppressing the complication of a cover configuration.

Means to Solve the Problem

The present disclosure is directed to a connector to be electrically connected to a connection target, the connector being provided with a plurality of connection terminals parallel to each other, a plurality of wires to be respectively connected to the plurality of connection terminals, a connector housing including a tubular portion provided with an opening for exposing end parts of the plurality of connection terminals, a cover for covering the opening by being inserted into the tubular portion, and an interlock connector provided inside the tubular portion, the interlock connector electrically detecting attachment and detachment of the cover to and from the connector housing, an end part of each of the plurality of connection terminals being provided with a through hole penetrating in an axial direction of the tubular portion, a bolt being inserted through the through hole, the cover including a cover terminal and an accommodating portion, the cover terminal being arranged in the accommodating portion, the interlock connector including a plurality of first terminals to be electrically connected to the cover terminal, a plurality of second terminals to be electrically connected to a standby terminal provided in the connection target, a plurality of flexible wires having flexibility, the flexible wires respectively electrically connecting the plurality of first terminals and the plurality of second terminals, a first housing for holding the plurality of first terminals, a second housing for holding the plurality of second terminals, and a holder for holding the first housing movably in a plane direction orthogonal to the axial direction, the holder covering the plurality of flexible wires, each of the plurality of flexible wires including an extra length portion allowing a movement of the first housing in the plane direction with respect to the holder, the accommodating portion accommodating the first housing and restricting a movement of the first housing in the plane direction, and the connector housing including a fixing portion for fixing the holder inside the tubular portion.

Effect of the Invention

According to the present disclosure, it is possible to suppress the complication of a cover configuration.

DETAILED DESCRIPTION TO EXECUTE THE INVENTION

Description of Embodiments of Present Disclosure

Figure 1:
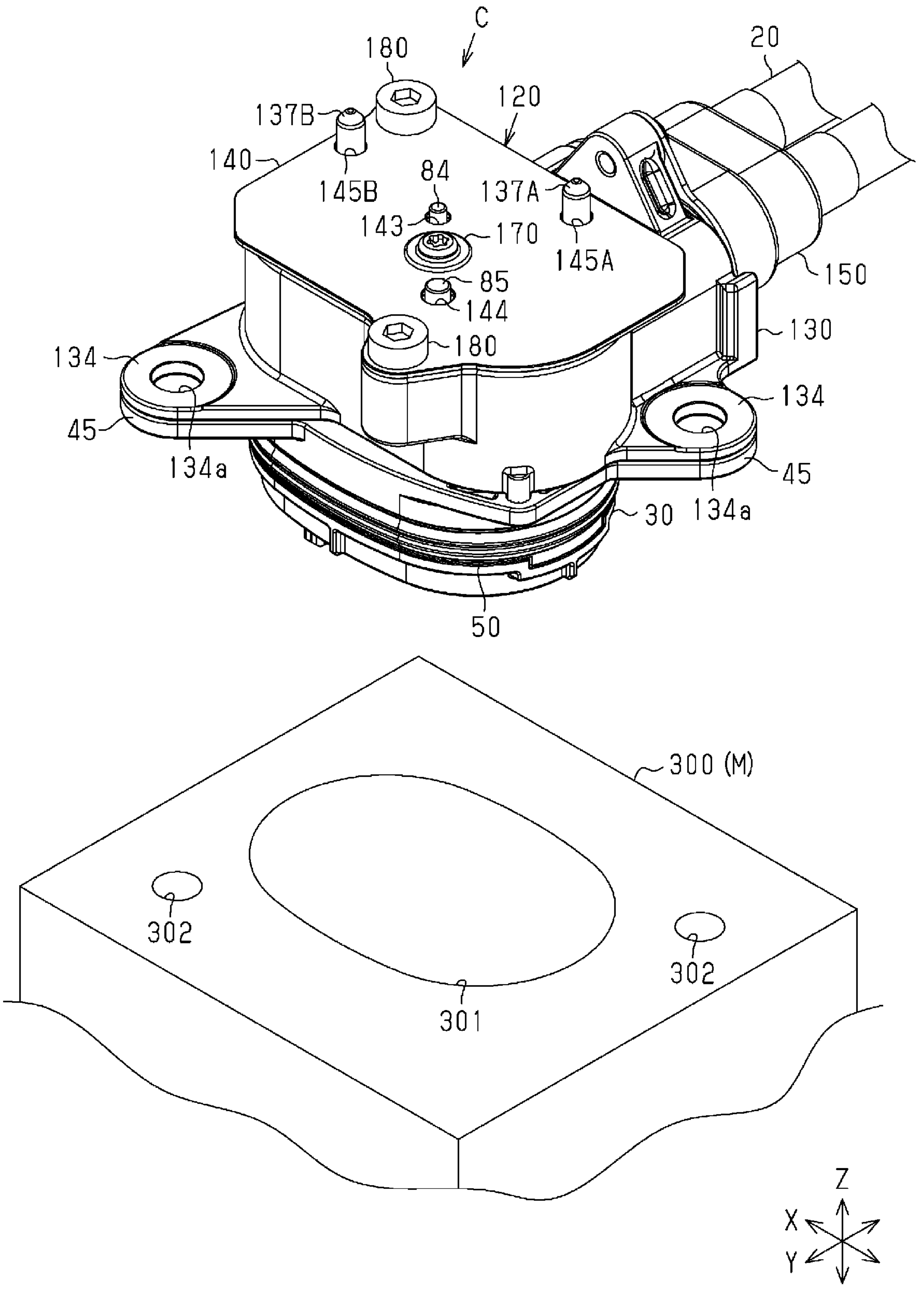
FIG. 1 is a perspective view of a connector of one embodiment.

First, embodiments of the present disclosure are listed and described.

[1] The connector of the present disclosure is to be electrically connected to a connection target and provided with a plurality of connection terminals parallel to each other, a plurality of wires to be respectively connected to the plurality of connection terminals, a connector housing including a tubular portion provided with an opening for exposing end parts of the plurality of connection terminals, a cover for covering the opening by being inserted into the tubular portion, and an interlock connector provided inside the tubular portion, the interlock connector electrically detecting attachment and detachment of the cover to and from the connector housing, an end part of each of the plurality of connection terminals being provided with a through hole penetrating in an axial direction of the tubular portion, a bolt being inserted through the through hole, the cover including a cover terminal and an accommodating portion, the cover terminal being arranged in the accommodating portion, the interlock connector including a plurality of first terminals to be electrically connected to the cover terminal, a plurality of second terminals to be electrically connected to a standby terminal provided in the connection target, a plurality of flexible wires having flexibility, the flexible wires respectively electrically connecting the plurality of first terminals and the plurality of second terminals, a first housing for holding the plurality of first terminals, a second housing for holding the plurality of second terminals, and a holder for holding the first housing movably in a plane direction orthogonal to the axial direction, the holder covering the plurality of flexible wires, each of the plurality of flexible wires including an extra length portion allowing a movement of the first housing in the plane direction with respect to the holder, the accommodating portion accommodating the first housing and restricting a movement of the first housing in the plane direction, and the connector housing including a fixing portion for fixing the holder inside the tubular portion.

According to this configuration, the first housing moves in the plane direction with respect to the holder fixed to the connector housing by the fixing portion. By accommodating such a first housing into the accommodating portion, a movement of the first housing in the plane direction is restricted. Thus, the cover terminal and the first terminals are aligned. Thus, a simple configuration of providing the accommodating portion in the cover can be adopted for the above alignment. Therefore, the complication of the configuration of the cover can be suppressed.

[2] Preferably, the connector housing includes a partition wall for partitioning inside of the tubular portion in the axial direction, the partition wall includes an insertion hole, the interlock connector being inserted through the insertion hole, the fixing portion includes an engaging piece cantilevered from the partition wall in the axial direction and configured to be resiliently deformable, and the engaging piece includes an engaging claw to be engaged with the holder.

According to this configuration, the interlock connector can be arranged inside the tubular portion by inserting the interlock connector into the insertion hole and fixing the holder by the engaging piece. Therefore, the fixing portion can be easily realized.

[3] Preferably, the connector housing includes a movement restricting portion facing the first housing in the plane direction inside the tubular portion, and the movement restricting portion restricts a movement of the first housing in the plane direction by contacting the first housing when the first housing moves in the plane direction.

According to this configuration, a movement of the first housing is restricted by the contact of the first housing and the movement restricting portion. Thus, an excessive movement of the first housing with respect to the holder is suppressed. Therefore, the cover terminal and the first terminals can be easily aligned.

[4] Preferably, the first housing includes a projection projecting toward an inner wall of the tubular portion and a recess open toward the inner wall of the tubular portion, the movement restricting portion includes a restricting recess for accommodating the projection and a restricting protrusion to be accommodated into the recess, and a movement of the first housing in the plane direction is restricted by contact of an outer surface of the projection with an inner surface of the restricting recess and contact of an inner surface of the recess with an outer surface of the restricting protrusion when the first housing moves in the plane direction.

According to this configuration, the configuration of the movement restricting portion can be easily realized.

[5] Preferably, the interlock connector includes a resilient member to be held in contact with an inner peripheral surface of the accommodating portion by being mounted on an outer peripheral surface of the first housing.

According to this configuration, since the resilient member contacts the inner surface of the accommodating portion, the vibration of the first housing with respect to the accommodating portion can be suppressed. In this way, for example, when the connector vibrates, it can be suppressed that the cover terminal and the first terminals are caused to slide by this vibration to be worn.

[6] Preferably, the first housing and the second housing are provided side by side in the axial direction.

According to this configuration, an increase in the size of the interlock connector in the plane direction can be suppressed. Therefore, an increase in the size of the interlock connector and, consequently, an increase in the size of the connector can be suppressed.

[7] Preferably, the holder holds each of the first housing and the second housing movably in the plane direction.

According to this configuration, the first housing and the second housing respectively move in the plane direction independently of each other with respect to the holder fixed to the connector housing by the fixing portion. Thus, the alignment of the cover terminal and the first terminals and the alignment of the standby terminal and the second terminals are individually performed. In this way, even if the standby terminal and the second terminals are aligned by moving the second housing, the first housing does not move according to this alignment. As a result, a worker can connect the cover terminal and the first terminals without considering the positions of the second terminals. Therefore, the cover can be easily mounted on a connector housing.

[8] A shield shell made of metal is provided which covers an outer periphery of the connector housing, the shield shell includes a first shell including an opening, the tubular portion being inserted into the opening, the first shell covering an outer periphery of the tubular portion, and a second shell mounted loosely movably with respect to the cover, the second shell being fixed to the first shell, the second shell covering the opening of the first shell, the cover includes a support protrusion projecting toward the second shell, the first shell includes a positioning protrusion projecting toward the second shell and a screw hole facing the second shell, and the second shell includes a support hole, the support protrusion being inserted into the support hole, a positioning hole, the positioning protrusion being inserted into the positioning hole, and a bolt hole, a bolt to be screwed into the screw hole being inserted through the bolt hole, and is positioned at a position where the bolt hole overlaps the entire screw hole in the axial direction by inserting the positioning protrusion into the positioning hole.

According to this configuration, the bolt hole and the entire screw hole overlap in the axial direction of the tubular portion by inserting the positioning protrusion into the positioning hole. In this way, the worker can easily align the bolt hole and the screw hole by inserting the positioning protrusion into the positioning hole. Therefore, workability during the manufacturing of the connector can be improved.

Details of Embodiment of Present Disclosure

A specific example of a connector of the present disclosure is described below with reference to the drawings. For the convenience of description, some components may be shown in an exaggerated or simplified manner in each drawing. Further, a dimension ratio of each part may be different in each drawing. Note that the present disclosure is not limited to these illustrations, but is represented by claims and intended to include all changes in the scope of claims and in the meaning and scope of equivalents. "Orthogonal" in this specification means not only strictly orthogonal, but also substantially orthogonal within a range in which functions and effects in this embodiment are achieved.

(Configuration of Connector C)

As shown in FIG. 1, a connector C is, for example, electrically connected to an electrical device M for vehicle such as a motor or inverter. The connector C is mounted on a case 300 while being partially inserted in an insertion hole 301 provided in the case 300 of the electrical device M. The electrical device M corresponds to a "connection target."

Figure 2:
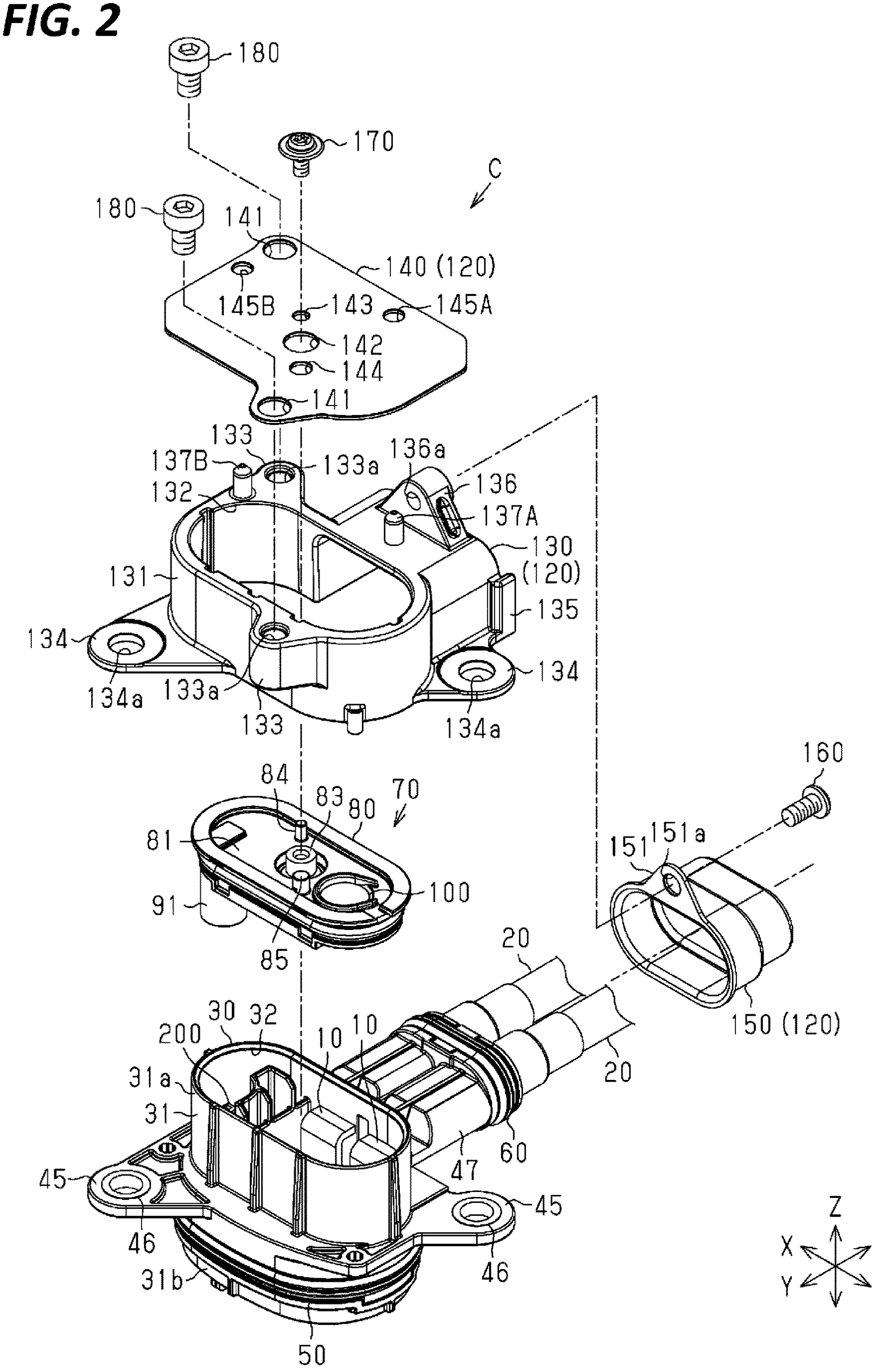
FIG. 2 is an exploded perspective view of the connector of the embodiment.
Figure 3:
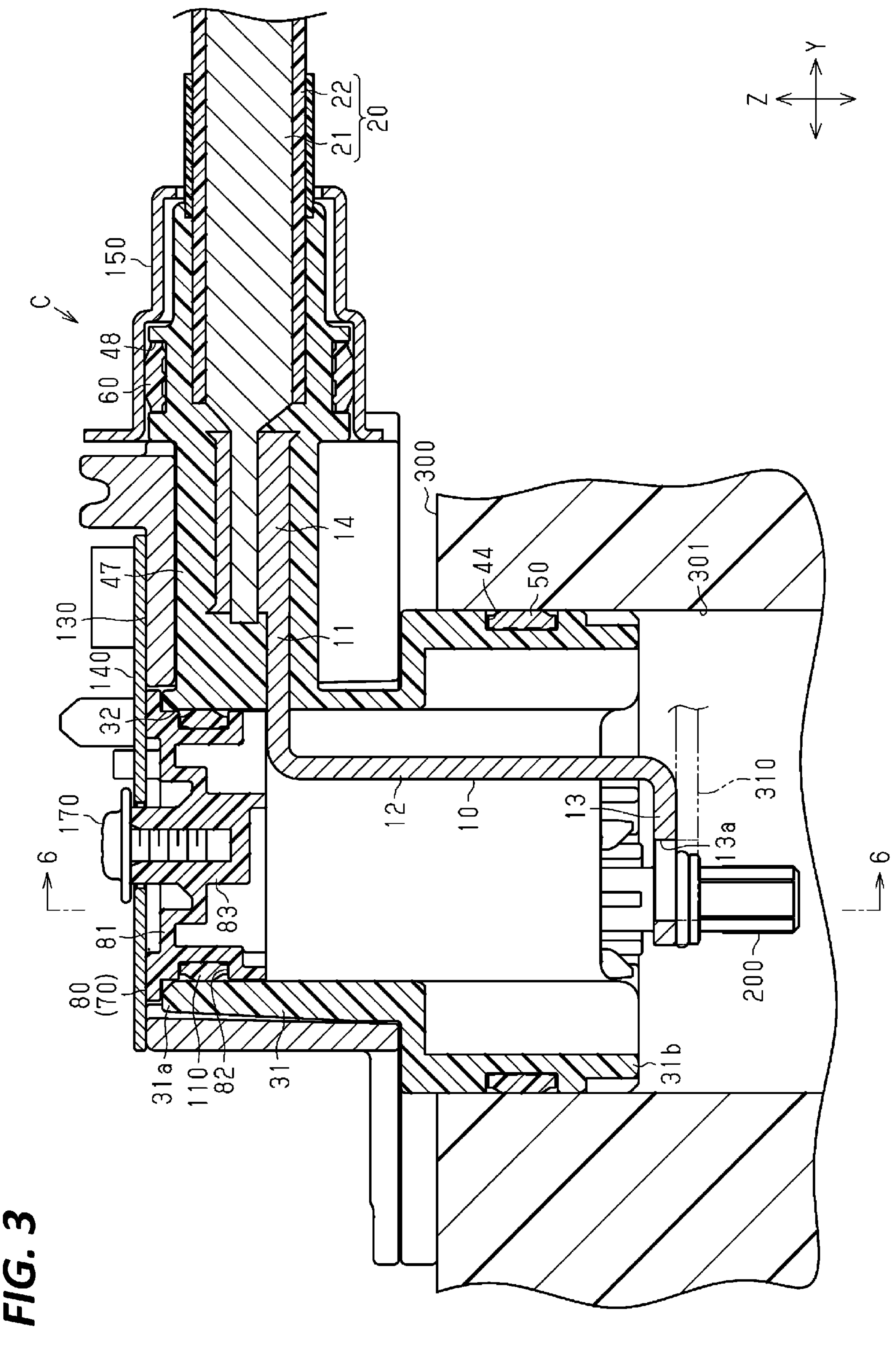
FIG. 3 is a section of the connector of the embodiment.

As shown in FIGS. 2 and 3, the connector C is provided with a plurality of connection terminals 10, a plurality of wires 20, a connector housing 30, an interlock connector 200, a cover 70 and a shield shell 120. The plurality of connection terminals 10 are parallel to each other. The plurality of wires 20 are respectively electrically connected to the plurality of connection terminals 10. The connector housing 30 holds the plurality of connection terminals 10 and the plurality of wires 20. The interlock connector 200 is provided inside the connector housing 30. The cover 70 covers a part of the connector housing 30. The shield shell 120 covers the cover 70 and a part of the connector housing 30.

The connector C includes, for example, two connection terminals 10 and two wires 20. Note that the connector C may include three or more connection terminals 10 and three or more wires 20.

Out of XYZ axes of each figure, the X axis extends in a parallel direction of the two connection terminals 10. The Y axis extends in a longitudinal direction of the wires 20. The Z axis extends in a mounting direction of the case 300 of the electrical device M and the connector C. The X axis, Y axis and Z axis are orthogonal to each other. A direction along the X axis is referred to as an X-axis direction, a direction along the Y axis is referred to as a Y-axis direction, and a direction along the Z axis is referred to as a Z-axis direction below. Further, a plane direction orthogonal to the Z-axis direction is merely referred to as a plane direction.

The connector C is, for example, mounted on the case 300 in such a posture that the X-axis direction coincides with a vertical direction. Note that an up-down direction in the plane of each figure does not necessarily coincide with the vertical direction.

(Configuration of Connection Terminal 10)

As shown in FIG. 3, the connection terminal 10 includes a first extending portion 11, a second extending portion 12 and a third extending portion 13. The connection terminal 10 is, for example, plate-like. An iron-based, copper-based or aluminum-based metal material or the like can be, for example, cited as a material of the connection terminal 10.

The first extending portion 11 extends in the Y-axis direction. The first extending portion 11 includes a wire connecting portion 14 to be electrically connected to the wire 20. The wire connecting portion 14 is provided on an end part in the Y-axis direction of the first extending portion 11.

The second extending portion 12 extends toward the case 300 in the Z-axis direction from an end part of the first extending portion 11 opposite to the wire connecting portion 14.

The third extending portion 13 extends toward a side opposite to the first extending portion 11 in an extending direction of the first extending portion 11, i.e. in the Y-axis direction, from an end part of the second extending portion 12 opposite to the first extending portion 11. The third extending portion 13 is located outside the connector housing 30.

The third extending portion 13 is provided with a through hole **13*a* penetrating in the Z-axis direction. The third extending portion 13 is electrically connected to a mating terminal 310 provided inside the case 300 by an unillustrated bolt inserted through the through hole 13*a***.

(Configuration of Wire 20)

The wire 20 includes a core wire 21 and an insulation coating 22 covering the outer periphery of the core wire 21. A copper-based or aluminum-based metal material or the like can be, for example, cited as a material of the core wire 21. A resin material mainly containing a polyolefin-based resin such as cross-linked polyethylene or cross-linked polypropylene can be, for example, cited as a material of the insulation coating 22.

The core wire 21 is, for example, a stranded wire formed by twisting a plurality of metal strands. A cross-sectional shape of the core wire 21 orthogonal to a length direction is, for example, circular.

The core wire 21 is exposed from the insulation coating 22 in an end part of the wire 20. The core wire 21 exposed from the insulation coating 22 is electrically connected to the wire connecting portion 14 of the connection terminal 10, for example, by crimping.

(Configuration of Connector Housing 30)

The connector housing 30 includes a tubular portion 31 and a holding portion 47. A resin material such as polybutylene terephthalate (PBT) or polyamide (PA) can be, for example, cited as a material of the connector housing 30.

(Configuration of Tubular Portion 31)

Figure 4:
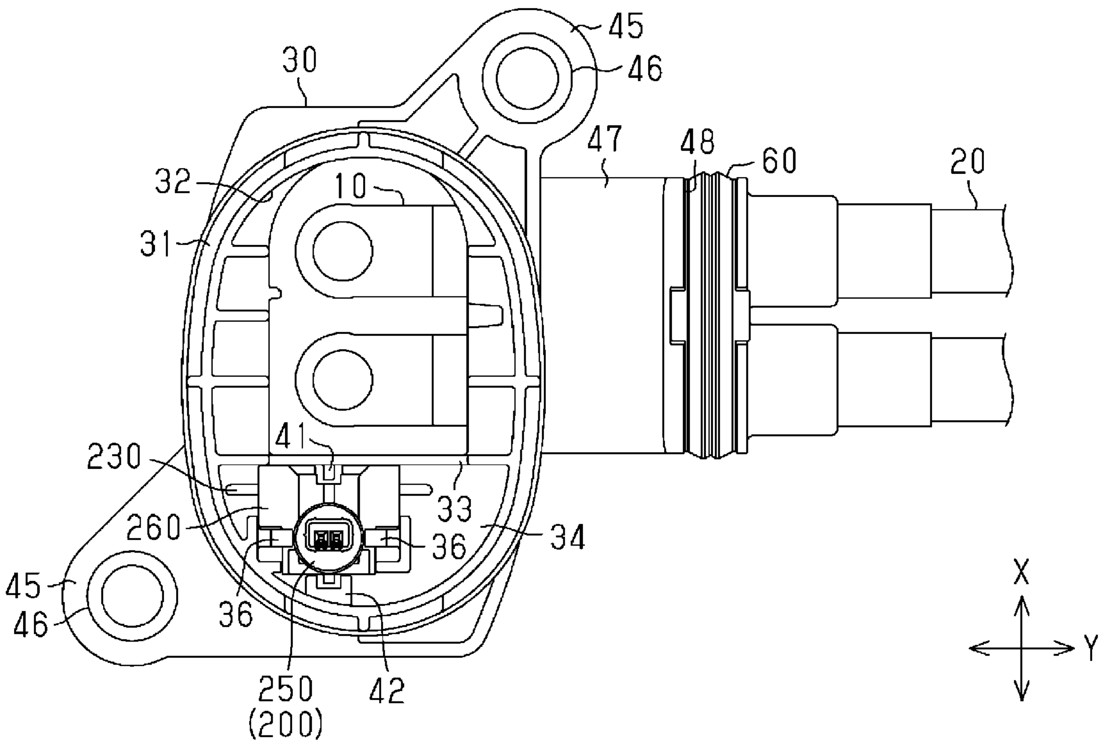
FIG. 4 is a bottom view of a housing of the embodiment.

As shown in FIG. 4, the tubular portion 31 includes an opening 32 for exposing the two connection terminals 10. The opening 32 penetrates through the tubular portion 31 in the Z-axis direction. An axial direction of the tubular portion 31 coincides with the Z-axis direction. The tubular portion 31 has an oval opening edge long in the X-axis direction when viewed from the Z-axis direction.

The interlock connector 200 is provided in parallel to the two connection terminals 10 in the X-axis direction inside the tubular portion 31.

As shown in FIG. 3, the tubular portion 31 includes a first end part 31*a* and a second end part 31*b* located on sides opposite to each other in the Z-axis direction. The first end part 31*a* is a part of the tubular portion 31 on a side where the cover 70 is mounted. The second end part 31*b* is a part of the tubular portion 31 on a side to be inserted into the insertion hole 301.

Figure 5:
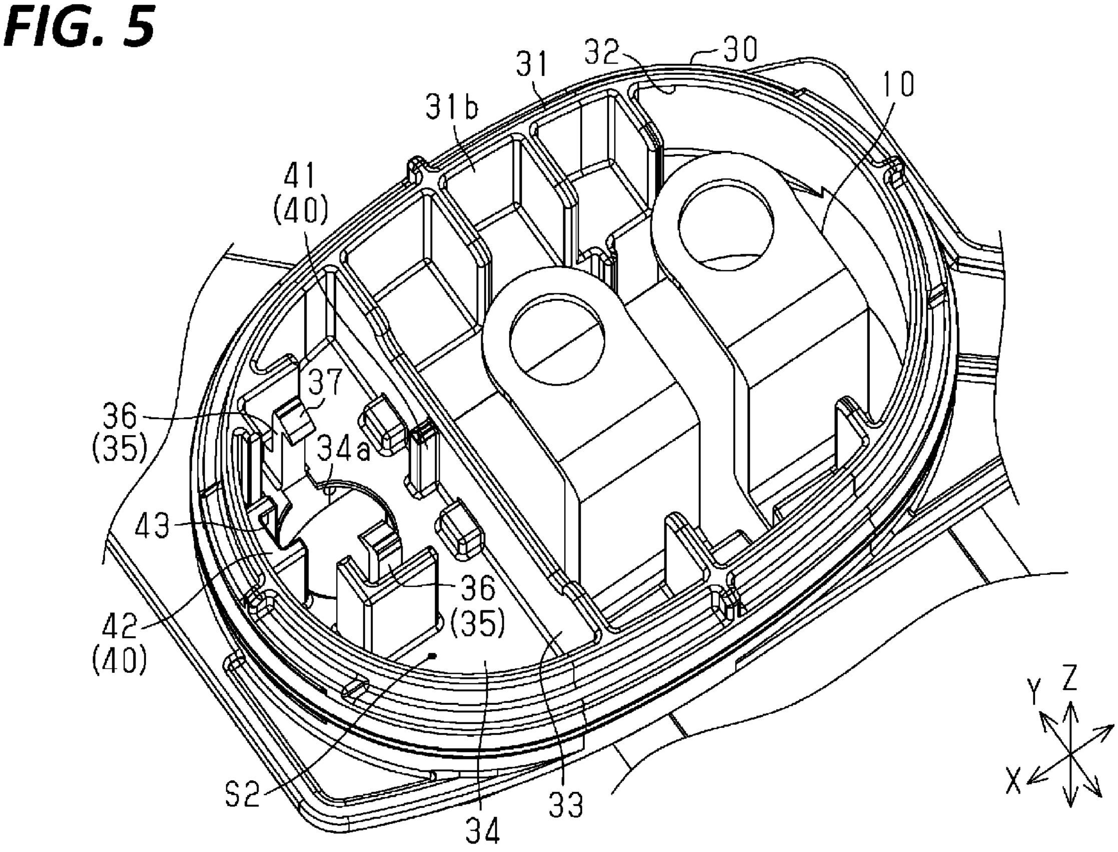
FIG. 5 is a perspective view of the housing of the embodiment.
Figure 6:
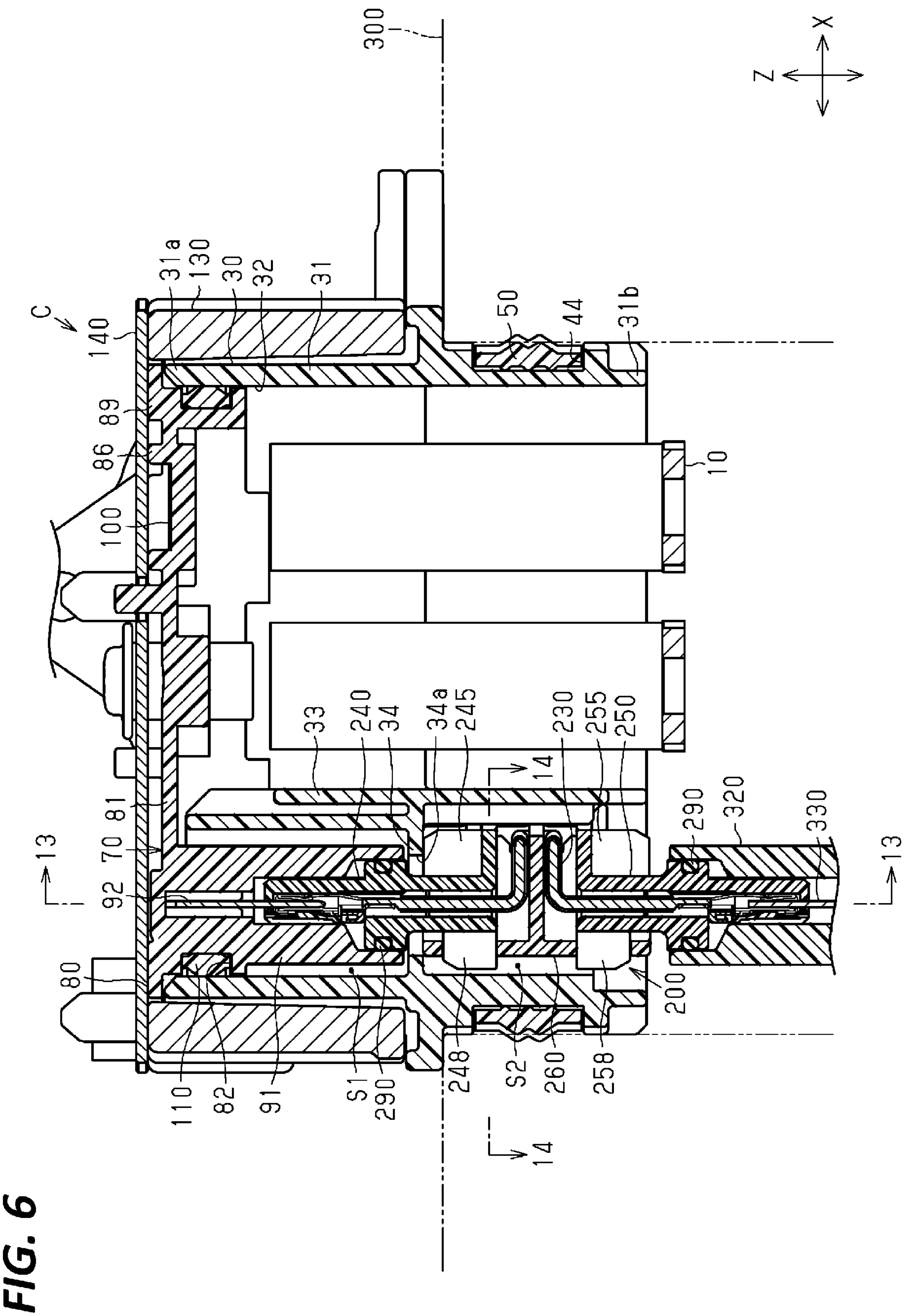
FIG. 6 is a section along 6-6 of FIG. 3.

As shown in FIGS. 4 to 6, the tubular portion 31 includes a first partition wall 33 and a second partition wall 34. The second partition wall 34 corresponds to a "partition wall."

The first partition wall 33 partitions the inside of the tubular portion 31 between the two connection terminals 10 and the interlock connector 200. The inside of the tubular portion 31 is partitioned into a space where the two connection terminals 10 are located and a space where the interlock connector 200 is located by the first partition wall 33. The first partition wall 33 extends in the Z-axis direction. The first partition wall 33 couples parts of the inner wall of the tubular portion 31 facing each other in the Y-axis direction.

As shown in FIG. 6, the second partition wall 34 partitions the space, where the interlock connector 200 is located, in the Z-axis direction. The space where the interlock connector 200 is located is partitioned into a first space S1 facing the cover 70 and a second space S2 facing the case 300 by the second partition wall 34. The second partition wall 34 extends in the plane direction. The second partition wall 34 couples the peripheral wall of the tubular portion 31 and the first partition wall 33.

The second partition wall 34 includes an insertion hole 34*a*, into which the interlock connector 200 is inserted. The insertion hole 34*a* penetrates through the second partition wall 34 in the Z-axis direction.

As shown in FIG. 5, the connector housing 30 includes a fixing portion 35 and a movement restricting portion 40. The fixing portion 35 and the movement restricting portion 40 are provided in the second space S2. The fixing portion 35 is for fixing a holder 260 of the interlock connector 200 to be described later inside the tubular portion 31. The movement restricting portion 40 is for restricting movements of a first housing 240 and a second housing 250 of the interlock connector 200 to be described later inside the tubular portion 31.

The fixing portion 35 includes two engaging pieces 36. Each engaging piece 36 is cantilevered from the second partition wall 34 toward a side where the second end part 31*b* is located in the Z-axis direction.

The two engaging pieces 36 are facing each other across the insertion hole 34*a* in the Y-axis direction. The two engaging pieces 36 are configured to be resiliently deformable in directions away from each other along the Y-axis direction.

An engaging claw 37 is provided on a tip part of each engaging piece 36. The engaging claws 37 of the two engaging pieces 36 are facing each other in the Y-axis direction.

The movement restricting portion 40 includes a restricting protrusion 41 extending from the second partition wall 34 toward the side where the second end part 31*b* is located in the Z-axis direction. The restricting protrusion 41 extends from a part of the second partition wall 34 between the insertion hole 34*a* and the first partition wall 33 in the X-axis direction. The restricting protrusion 41 is coupled to the first partition wall 33 entirely in the Z-axis direction. A cross-sectional shape of the restricting protrusion 41 orthogonal to the Z-axis direction is, for example, rectangular. This cross-sectional shape is the same over the entire restricting protrusion 41 in the Z-axis direction.

The movement restricting portion 40 includes a rib 42 facing the restricting protrusion 41 across the insertion hole 34*a* in the X-axis direction. The rib 42 extends from the second partition wall 34 toward the side where the second end part 31*b* is located in the Z-axis direction. The rib 42 is coupled to the peripheral wall of the tubular portion 31 entirely in the Z-axis direction.

The rib 42 includes a restricting recess 43 facing the restricting protrusion 41. The restricting recess 43 is in the form of a groove extending over the entire rib 42 in the Z-axis direction. A cross-sectional shape of the restricting recess 43 orthogonal to the Z-axis direction is, for example, rectangular. This cross-sectional shape is the same over the entire rib 42 in the Z-axis direction.

As shown in FIG. 3, a first accommodation groove 44 is provided over an entire periphery in the outer peripheral surface of a part of the tubular portion 31 to be inserted into the insertion hole 301. An annular first sealing member 50 is accommodated in the first accommodation groove 44. Water is stopped in a part between the outer peripheral surface of the tubular portion 31 and the inner peripheral surface of the insertion hole 301 by the first sealing member 50.

As shown in FIG. 4, the tubular portion 31 includes two flanges 45 projecting toward an outer peripheral side of the tubular portion 31. The two flanges 45 project toward sides opposite to each other in a plane direction intersecting both the X and Y axes. Each flange 45 is provided with a tubular collar 46 made of metal. Each collar 46 penetrates in the Z-axis direction.

(Configuration of Holding Portion 47)

As shown in FIG. 3, the holding portion 47 projects from the first end part 31*a* of the tubular portion 31 toward the outer peripheral side of the tubular portion 31, more particularly toward one side in the Y-axis direction. The holding portion 47 holds the two connection terminals 10 and the two wires 20. End parts of the wires 20, the wire connecting portions 14 and parts of the first extending portions 11 are embedded in the holding portion 47. The two connection terminals 10, the two wires 20 and the connector housing 30 are integrated by insert molding. Each wire 20 is pulled out toward the one side in the Y-axis direction from the holding portion 47.

A second accommodation groove 48 is provided over an entire periphery in the outer peripheral surface of the holding portion 47. An annular second sealing member 60 is accommodated in the second accommodation groove 48. Water is stopped in a part between the outer peripheral surface of the holding portion 47 and the inner peripheral surface of a third shell 150 to be described later by the second sealing member 60.

(Configuration of Interlock Connector 200)

As shown in FIG. 6, the interlock connector 200 electrically connects a cover terminal 92 of the cover 70 to be described later and standby terminals 330 of a standby connector 320 provided inside the case 300.

The interlock connector 200 is for electrically detecting the attachment and detachment of the connector housing 30 to and from the case 300 and the attachment and detachment of the cover 70 to and from the connector housing 30. An interlock circuit is constituted by the cover terminal 92, the interlock connector 200 and the standby terminals 330. If the cover terminal 92 and the standby terminals 330 are electrically connected via the interlock connector 200, i.e. if the interlock circuit is closed, the connector C and the electrical device M enter an electrically conductive state.

Figure 7:
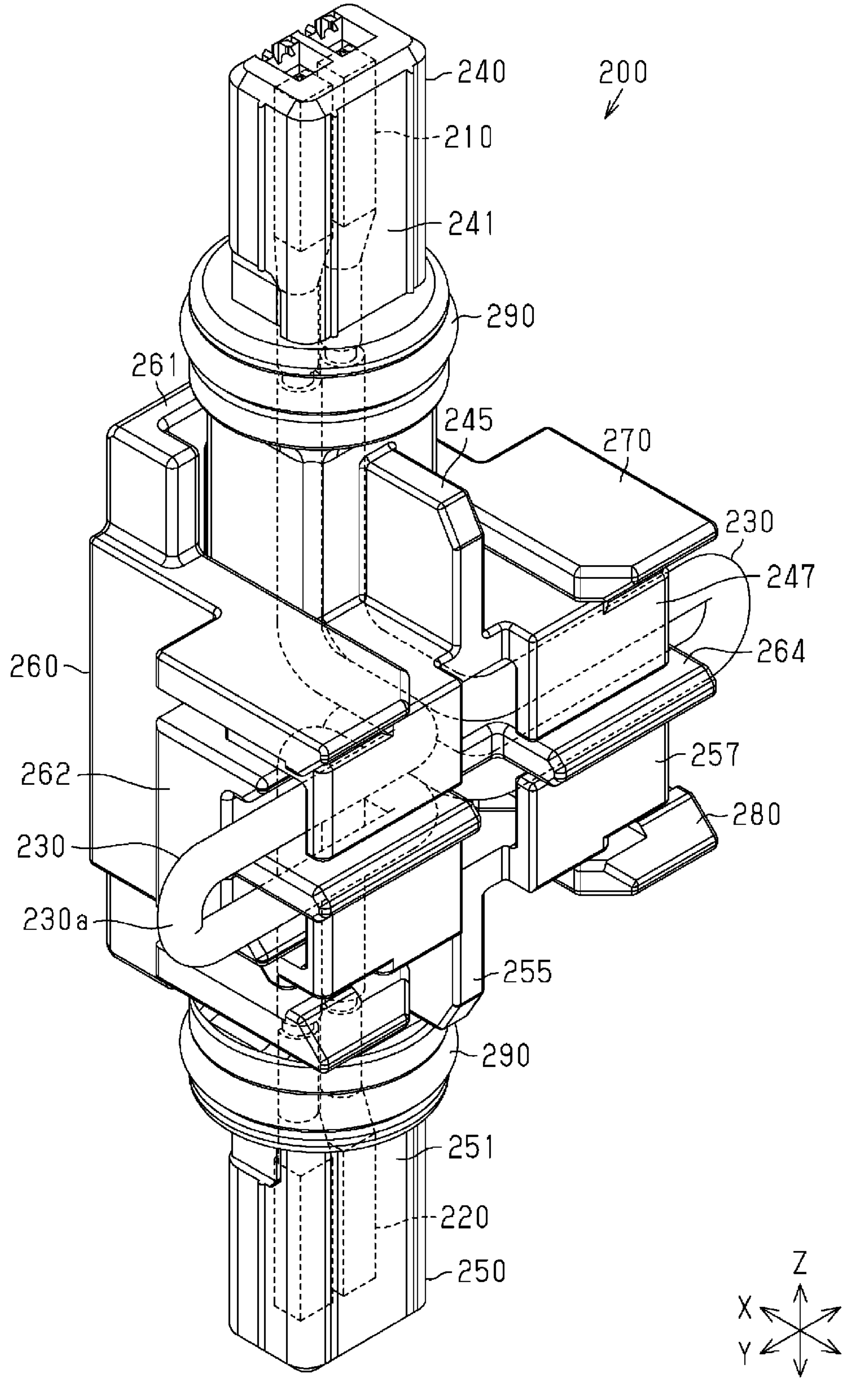
FIG. 7 is a perspective view of an interlock connector of the embodiment.

As shown in FIG. 7, the interlock connector 200 is provided with a plurality of first terminals 210, a plurality of second terminals 220, a plurality of flexible wires 230, the first housing 240, the second housing 250 and the holder 260.

The interlock connector 200 is, for example, provided with two first terminals 210, two second terminals 220 and two flexible wires 230. Note that the interlock connector 200 may be provided with three or more first terminals 210, three or more second terminals 220 and three or more flexible wires 230.

The two flexible wires 230 respectively electrically connect the two first terminals 210 and the two second terminals 220. The first housing 240 holds the two first terminals 210 in parallel in the Y-axis direction. The second housing 250 holds the two second terminals 220 in parallel in the Y-axis direction. The holder 260 holds each of the first housing 240 and the second housing 250 movably in the plane direction.

(Configuration of First Terminal 210)

Figure 8:
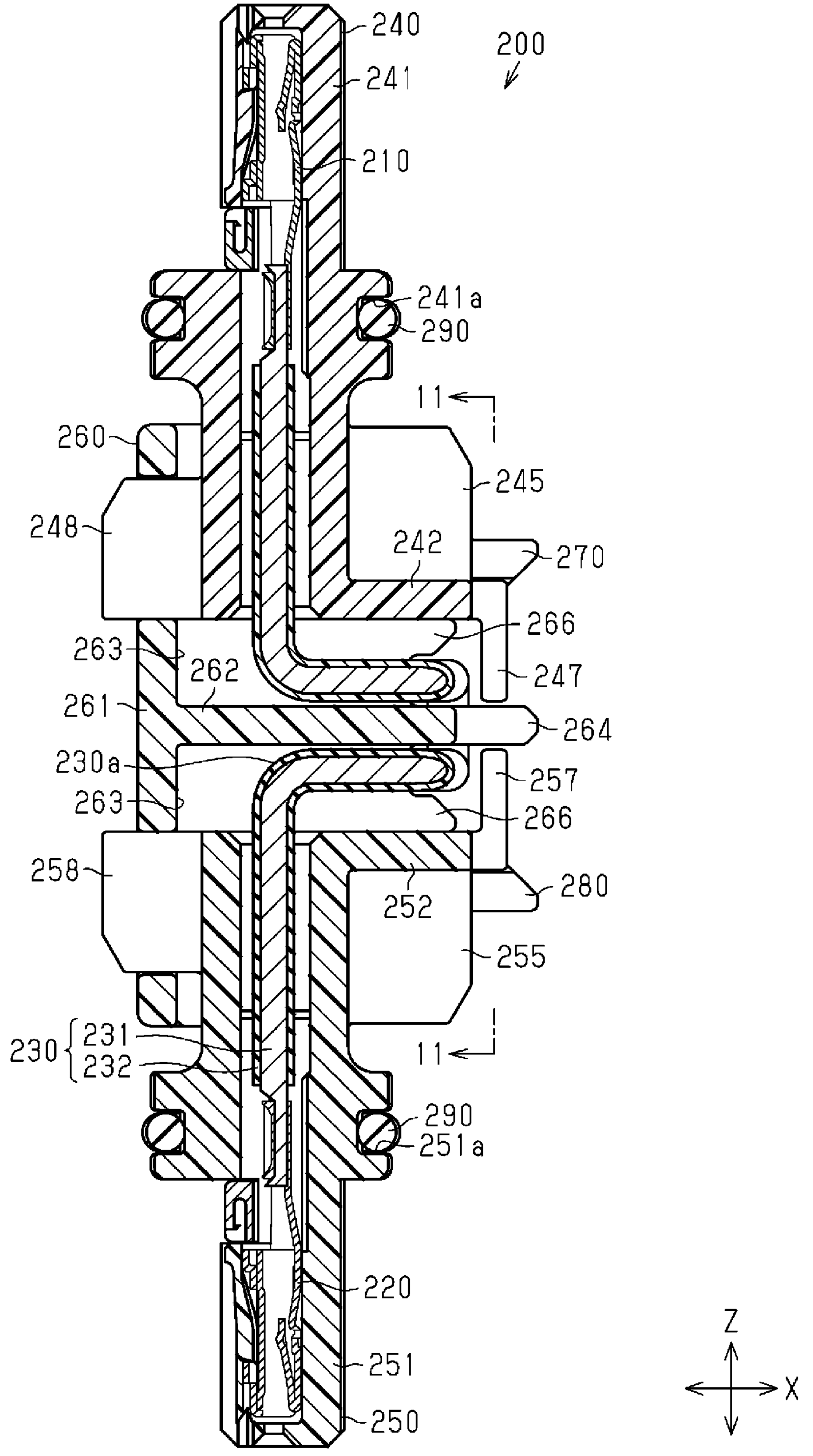
FIG. 8 is a section of the interlock connector of the embodiment.

As shown in FIG. 8, the first terminal 210 is a female terminal elongated in the Z-axis direction. The first terminal 210 includes a base end part and a tip part in the Z-axis direction. The base end part of the first terminal 210 is electrically connected to the flexible wire 230. The tip part of the first terminal 210 is electrically connected to the cover terminal 92 (see FIG. 13). The two first terminals 210 are shorted by the cover terminal 92.

An iron-based, copper-based or aluminum-based metal material or the like can be, for example, cited as a material of the first terminal 210.

(Configuration of Second Terminal 220)

The second terminal 220 has the same shape and size as the first terminal 220.

A base end part of the second terminal 220 is electrically connected to the flexible wire 230. A tip part of the second terminal 220 is electrically connected to the standby terminal 330 (see FIG. 13).

An iron-based, copper-based or aluminum-based metal material or the like can be, for example, cited as a material of the second terminal 220.

(Configuration of First Housing 240)

The first housing 240 is provided to be attachable to and detachable from the holder 260. A resin material such as polybutylene terephthalate (PBT) can be, for example, cited as a material of the first housing 240.

The first housing 240 includes a terminal accommodating portion 241 and a first held portion 242. The first terminals 210 and parts of the flexible wires 230 are accommodated in the terminal accommodating portion 241. The first held portion 242 is held slidably with respect to the holder 260.

The terminal accommodating portion 241 has a tubular shape extending in the Z-axis direction. Locking lances to be engaged with the first terminals 210 are provided inside the terminal accommodating portion 241. By the engagement of these locking lances with the first terminals 210, the first terminals 210 are held inside the terminal accommodating portion 241.

An accommodation groove 241*a* is provided over an entire periphery in the outer peripheral surface of the terminal accommodating portion 241. An annular resilient member 290 is accommodated in the accommodation groove 241*a*. The resilient member 290 is in contact with the inner peripheral surface of an accommodating portion 91 of the cover 70 to be described later (see FIG. 6). The vibration of the first housing 240 with respect to the accommodating portion 91 is suppressed by the resilient member 290.

Figure 9:
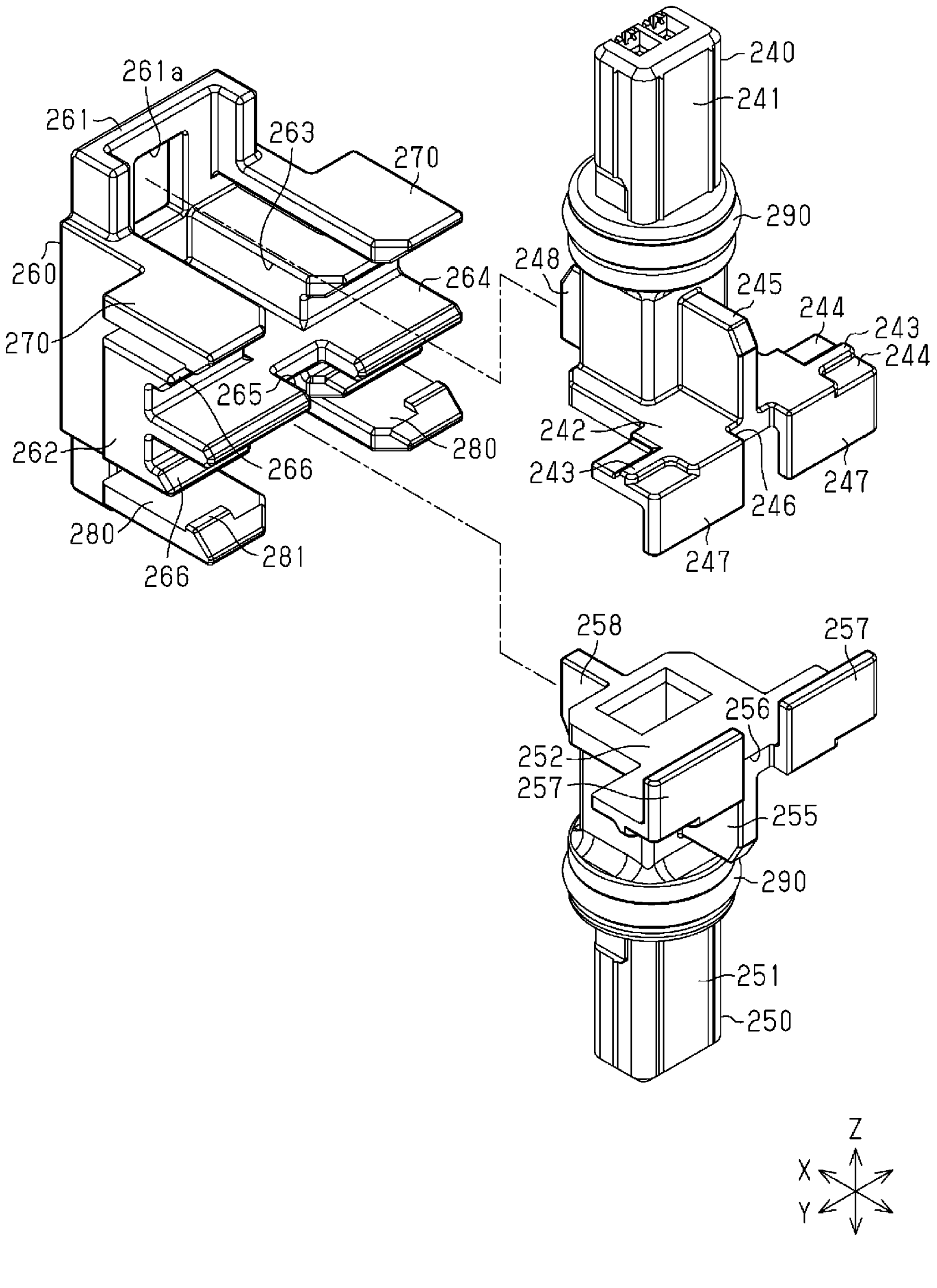
FIG. 9 is an exploded perspective view of the interlock connector of the embodiment.

As shown in FIG. 9, the first held portion 242 includes a part projecting toward one side in the X-axis direction from the terminal accommodating portion 241 and parts extending toward both sides in the Y-axis direction from the former part. The first held portion 242 extends from an end part of the terminal accommodating portion 241 opposite to an end part for accommodating the first terminals 210. The first held portion 242 is in the form of a plate extending in the plane direction.

Projections 243 extending in the Y-axis direction are respectively provided on both end parts in the Y-axis direction of the first held portion 242. Each projection 243 is formed by two dents 244 adjacent to this projection 243 on both sides in the X-axis direction.

The first housing 240 includes a restricting rib 245 projecting toward the one side in the X-axis direction from the terminal accommodating portion 241. The restricting rib 245 projects toward the first partition wall 33 (see FIG. 6). The restricting rib 245 is in the form of a plate extending in an XZ plane. The restricting rib 245 is coupled to a central part of the first held portion 242 in the Y-axis direction. The tilt of the terminal accommodating portion 241 with respect to the first held portion 242 is restricted by the restricting rib 245.

A first recess 246 is provided in the projecting end of the first held portion 242 in the X-axis direction. The first recess 246 is open toward the first partition wall 33, which is a part of the inner wall of the tubular portion 31 (see FIG. 14). The first recess 246 penetrates through the first held portion 242 in the Z-axis direction. The first recess 246 is shaped by cutting the projecting end of the first held portion 242. The first recess 246 is provided at a position side by side with the terminal accommodating portion 241 in the X-axis direction. The inner surface of the first recess 246 is continuous with an end surface of the restricting rib 245 in the X-axis direction. The first recess 246 corresponds to a "recess."

Two restricting walls 247 are provided on the projecting end of the first held portion 242 in the X-axis direction. Each restricting wall 247 projects from the projecting end toward a side opposite to the terminal accommodating portion 241 in the Z-axis direction and extends in the Y-axis direction.

The two restricting walls 247 are provided on mutually opposite sides across the first recess 246 in the Y-axis direction.

As shown in FIGS. 8 and 9, the first housing 240 includes a first projection 248 projecting from the terminal accommodating portion 241 toward a side opposite to the restricting rib 245 in the X-axis direction. The first projection 248 projects toward the peripheral wall of the tubular portion 31 (see FIG. 6). The first projection 248 is in the form of a plate extending in the XZ plane. The first projection 248 corresponds to a "projection."

As shown in FIG. 6, the first housing 240 is inserted through the insertion hole 34*a* of the second partition wall 34. A part of the first housing 240 where the resilient member 290 is provided is located in the first space S1. A part of the first housing 240 where the restricting rib 245 and the first projection 248 are provided is located in the second space S2.

(Configuration of Second Housing 250)

As shown in FIGS. 8 and 9, the second housing 250 has the same shape as the first housing 240. The second housing 250 has the same size as the first housing 240.

In the following description, repeated description may be omitted by denoting components of the second housing 250 by reference signs "25*" obtained by adding "10" to reference signs "24*" denoting the components of the first housing 240. Note that "*" is a positive integer including 0.

A resin material such as polybutylene terephthalate (PBT) can be, for example, cited as a material of the second housing 250.

The second housing 250 is provided side by side with the first housing 240 in the Z-axis direction. The first and second housings 240, 250 are provided in mutually opposite orientations in the Z-axis direction. The posture of the second housing 250 is the same as the posture of the first housing 240 inverted in the Z-axis direction.

As shown in FIG. 9, the second housing 250 includes a second projection 258. A projection direction of the second projection 258 is the same as that of the first projection 248.

As shown in FIG. 6, a part of the second housing 250 where a resilient member 290 is provided is located outside the second space S2. A part of the second housing 250 where a restricting rib 255 and the second projection 258 are provided is located in the second space S2.

(Configuration of Holder 260)

As shown in FIGS. 7 and 8, the holder 260 covers parts of the two flexible wires 230 exposed from the first and second housings 240, 250. A resin material such as polybutylene terephthalate (PBT) can be, for example, cited as a material of the holder 260.

Figure 10:
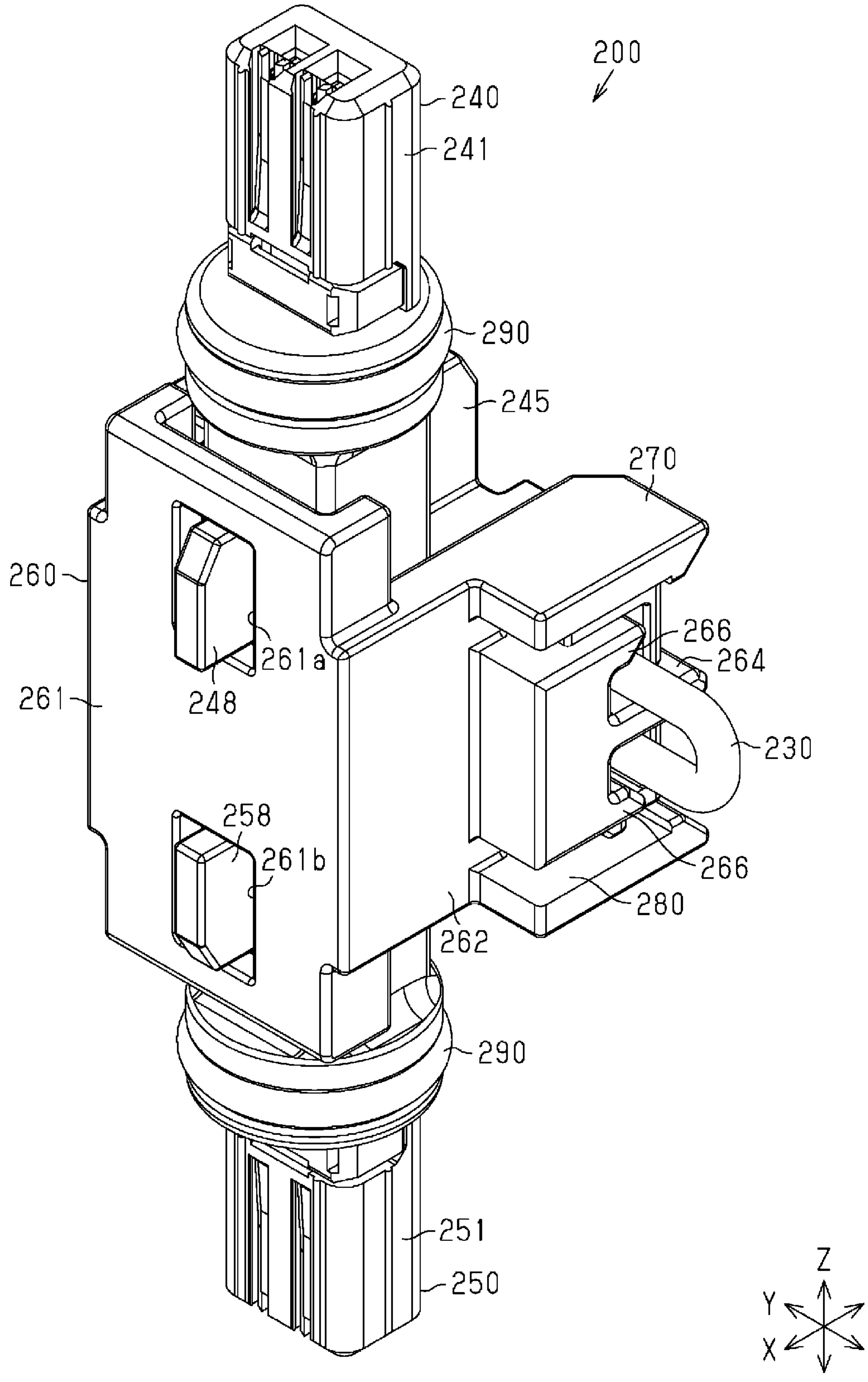
FIG. 10 is a perspective view of the interlock connector of the embodiment.

As shown in FIGS. 9 and 10, the holder 260 includes a base portion 261, a partitioning portion 262, two first holding portions 270 and two second holding portions 280. The holder 260 is plane-symmetrical with respect to a virtual plane including a center of the holder 260 in the Z-axis direction and extending in the plane direction. Further, the holder 260 is plane-symmetrical with respect to a virtual plane including a center of the holder 260 in the Y-axis direction and extending in the XZ plane.

Out of the components of the holder 260, identical components may be denoted by the same reference signs and repeated description may be omitted below.

(Configuration of Base Portion 261)

The base portion 261 is in the form of a rectangular plate extending in a YZ plane and long in the Z-axis direction.

The base portion 261 covers the first and second housings 240, 250 from a side where the first and second projections 248, 258 are provided.

As shown in FIG. 10, the base portion 261 includes a first restricting hole 261*a* and a second restricting hole 261*b* penetrating through the base portion 261 in the X-axis direction. The first and second restricting holes 261*a*, 261*b* are spaced apart from each other in the Z-axis direction. The first and second restricting holes 261*a*, 261*b* have a rectangular shape long in the Z-axis direction. The first and second restricting holes 261*a*, 261*b* have the same shape and size.

The first projection 248 of the first housing 240 is inserted in the first restricting hole 261*a*. The second projection 258 of the second housing 250 is inserted in the second restricting hole 261*b*.

A width in the Y-axis direction of the first restricting hole 261*a* is larger than that of the first projection 248. A width in the Y-axis direction of the second restricting hole 261*b* is larger than that of the second projection 258.

(Configuration of Partitioning Portion 262)

As shown in FIGS. 7 to 9, the partitioning portion 262 projects toward the one side in the X-axis direction from the base portion 261. The partitioning portion 262 is for partitioning between the first and second housings 240, 250 in the Z-axis direction. The partitioning portion 262 is, for example, block-like.

The partitioning portion 262 is in contact with the first held portion 242 of the first housing 240 in the Z-axis direction.

The partitioning portion 262 includes two escaping recesses 263 for allowing the flexible wires 230 pulled out from the respective housings 240, 250 to escape. Each escaping recess 263 is provided in a center of the partitioning portion 262 in the Y-axis direction. The respective escaping recesses 263 are facing the respective housings 240, 250 in the Z-axis direction.

The partitioning portion 262 includes a path restricting portion 264 extending along the two flexible wires 230 and configured to restrict routing paths of the two flexible wires 230. The path restricting portion 264 is provided in a center of the partitioning portion 262 in the Z-axis direction. The path restricting portion 264 is in the form of a plate extending in the plane direction. The path restricting portion 264 partitions between the respective flexible wires 230 in the Z-axis direction.

As shown in FIG. 8, the path restricting portion 264 projects further toward the one side in the X-axis direction than other parts of the partitioning portion 262. The path restricting portion 264 projects beyond the restricting walls 247, 257 of the respective housings 240, 250 in the X-axis direction.

As shown in FIG. 9, the projecting end of the path restricting portion 264 in the X-axis direction extends over the entire partitioning portion 262 in the Y-axis direction. A cut 265 is provided in a center of the projecting end in the Y-axis direction. The cut 265 penetrates through the path restricting portion 264 in the Z-axis direction. The cut 265 is arranged side by side with the first recess 246 of the first housing 240 and a second recess 256 of the second housing 250 in the Z-axis direction.

As shown in FIGS. 9 and 10, the partitioning portion 262 includes a plurality of protruding portions 266 located on both sides of the path restricting portion 264 in the Z-axis direction and protruding toward the one side in the X-axis direction. Two protruding portions 266 are provided at mutually opposite sides across the escaping recess 263 in the Y-axis direction on each of the both sides of the path restricting portion 264 in the Z-axis direction. Therefore, the partitioning portion 262 includes four protruding portions 266.

As shown in FIG. 8, each protruding portion 266 is located on a side opposite to the path restricting portion 264 across the flexible wire 230. An inclined surface is provided on an end part of each protruding portion 266 in the X-axis direction. This inclined surface is inclined to approach the path restricting portion 264 in the Z-axis direction toward the base portion 261 in the X-axis direction. A gap is provided in the X-axis direction between the end part of each protruding portion 266 and the restricting wall 247, 257 of each housing 240, 250.

Spaces in which the flexible wires 230 are routed in the Y-axis direction are defined by the path restricting portion 264, the respective protruding portions 266 and the respective restricting walls 247, 257.

(Configurations of First Holding Portions 270 and Second Holding Portions 280)

Figure 11:
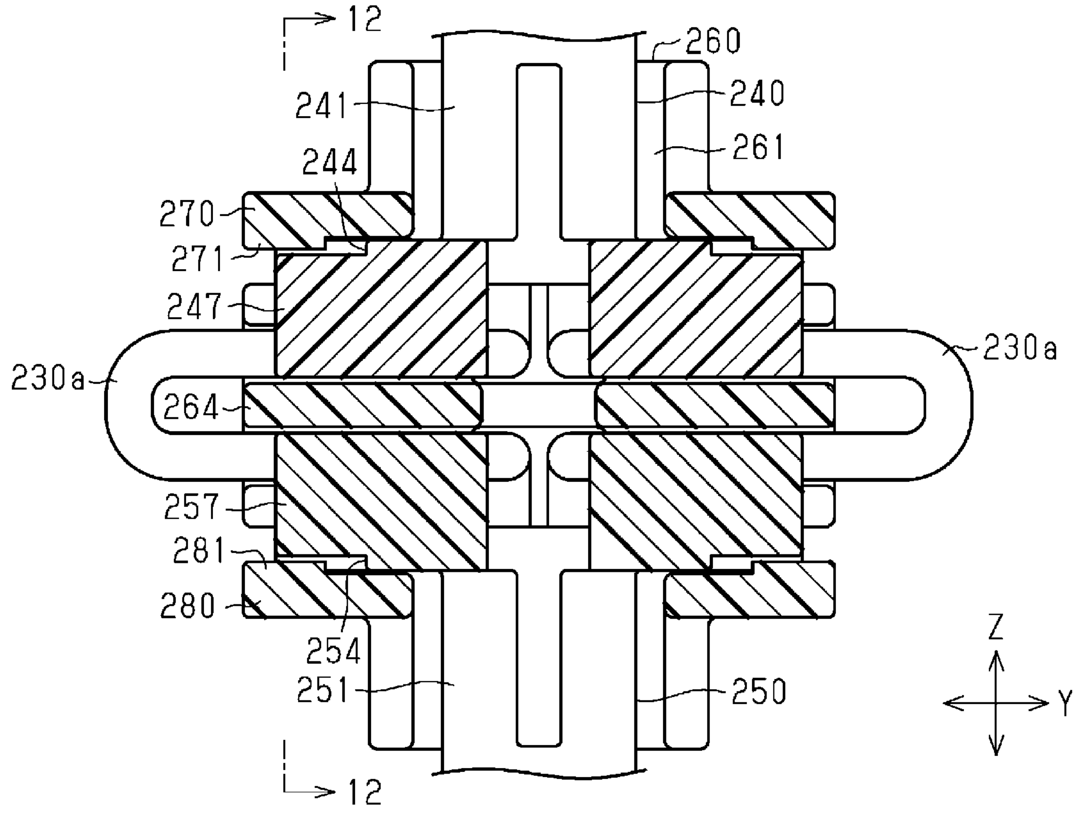
FIG. 11 is a section of the interlock connector of the embodiment.
Figure 12:
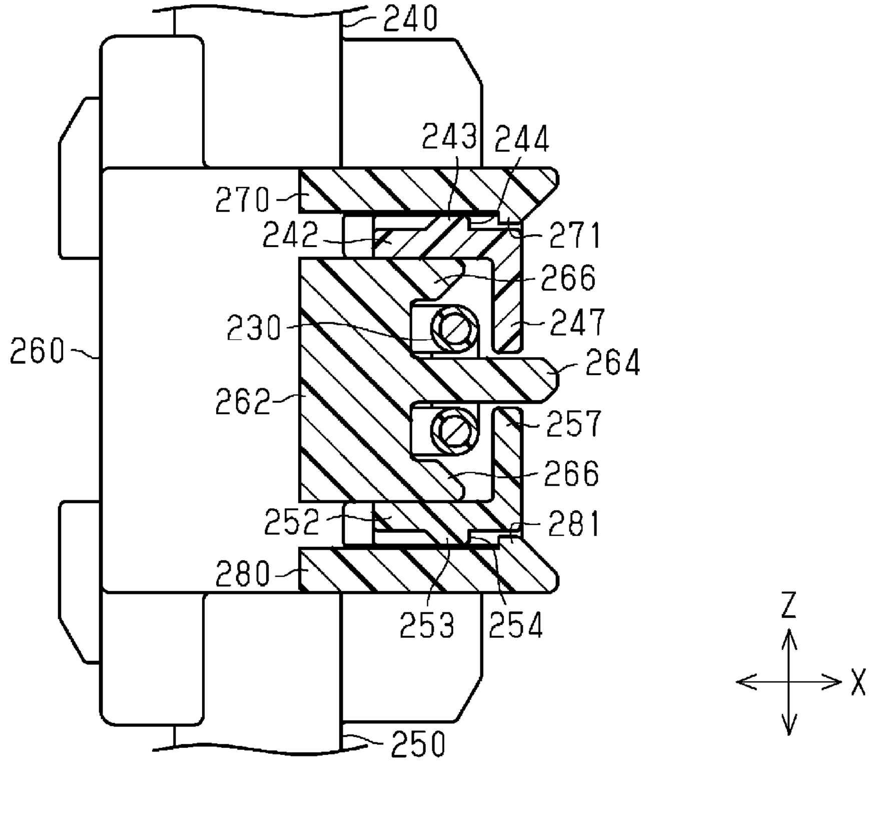
FIG. 12 is a section along 12-12 of FIG. 11.

As shown in FIGS. 11 and 12, the first and second holding portions 270, 280 have the same shape.

In the following description, repeated description may be omitted by denoting components of the second holding portion 280 by reference signs "28*" obtained by adding "10" to reference signs "27*" denoting components of the first holding portion 270. Note that "*" is a positive integer including 0.

Each first holding portion 270 projects toward the one side in the X-axis direction in an end part of the partitioning portion 262 in the Z-axis direction. Each first holding portion 270 is facing the protruding portion 266 in the Z-axis direction. Each first holding portion 270 is in contact with the first held portion 242 of the first housing 240 from a side opposite to the partitioning portion 262 in the Z-axis direction. Therefore, the first held portion 242 is sandwiched by the partitioning portion 262 and the first holding portions 270.

The first held portion 242 is provided slidably in the plane direction with respect to the partitioning portion 262 and the first holding portions 270. Therefore, the first housing 240 is allowed to move in the plane direction while being restricted from moving in the Z-axis direction by the holder 260.

A restricting claw 271 for restricting the separation of the first housing 240 from the holder 260 is provided on the projecting end of the first holding portion 270. The restricting claw 271 is located in the dent 244 of the first held portion 242.

As shown in FIG. 11, each restricting claw 271 is facing the inner surface of the dent 244 in the Y-axis direction. Thus, the restricting claws 271 contact the inner surfaces of the dents 244 when the first housing 240 moves in the Y-axis direction with respect to the holder 260.

As shown in FIG. 12, each restricting claw 271 is facing the projection 243 in the X-axis direction. Thus, the restricting claws 271 contact the projections 243 when the first housing 240 moves in the X-axis direction with respect to the holder 260.

From the above, the separation of the first housing 240 from the holder 260 is restricted and a movement range of the first housing 240 with respect to the holder 260 is restricted by the respective restricting claws 271. Similarly, the separation of the second housing 250 from the holder 260 is restricted and a movement range of the second housing 250 with respect to the holder 260 is restricted by respective restricting claws 281.

Figure 13:
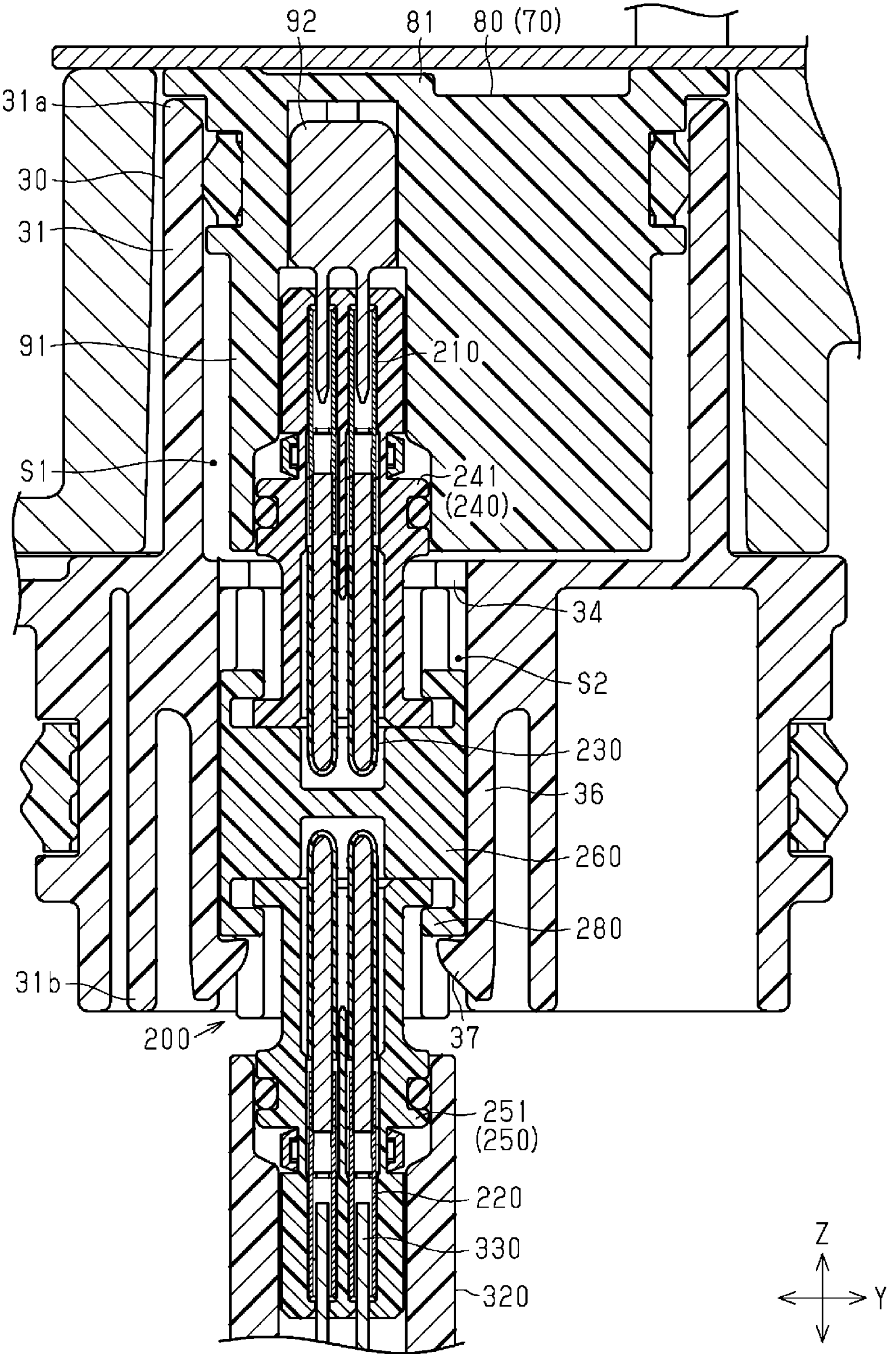
FIG. 13 is a section along 13-13 of FIG. 6.

As shown in FIG. 13, the holder 260 is fixed by the respective engaging pieces 36 inside the tubular portion 31. When the interlock connector 200 is inserted into the tubular portion 31 through the second space S2, the holder 260 contacts the two engaging pieces 36, whereby the two engaging pieces 36 are resiliently deformed in directions away from each other. Thereafter, if the holder 260 moves to a position to contact the second partition wall 34, the two engaging pieces 36 resiliently return, whereby the holder 260 is fixed inside the tubular portion 31. At this time, the engaging claws 37 of the respective engaging pieces 36 are engaged with the outer surfaces of the second holding portions 280 of the holder 260 in the Z-axis direction.

(Configuration of Flexible Wire 230)

As shown in FIG. 8, the flexible wire 230 includes a core wire 231 and an insulation coating 232 covering the outer periphery of the core wire 231. The flexible wire 230 has flexibility. A copper-based or aluminum-based metal material or the like can be, for example, cited as a material of the core wire 231. A resin material mainly containing a polyolefin-based resin such as cross-linked polyethylene or cross-linked polypropylene can be, for example, cited as a material of the insulation coating 232.

The core wire 231 is, for example, a stranded wire formed by twisting a plurality of metal strands. A cross-sectional shape of the core wire 231 orthogonal to a length direction is, for example, circular.

The core wire 231 is exposed from the insulation coating 232 in both end parts of the flexible wire 230. Both end parts of the core wire 231 exposed from the insulation coating 232 are respectively electrically connected to the first terminal 210 and the second terminal 220, for example, by crimping.

Each flexible wire 230 includes an extra length portion **230*a* pulled out from the first and second housings 240, 250. The extra length portion 230*a* is a part of the flexible wire 230 exposed from the first and second housings 240, 250**.

A length of the extra length portion **230*a* is longer than a shortest distance in the Z-axis direction between the first and second housings 240, 250. Movements of the first and second housings 240, 250 in the plane direction with respect to the holder 260 are allowed by the extra length portions 230*a*** having flexibility.

As shown in FIGS. 8 and 11, two extra length portions **230*a* extend along the path restricting portion 264. The two extra length portions 230*a* pulled out from the first housing 240 include parts extending toward the restricting walls 247 and parts extending from the former parts toward mutually opposite sides in the Y-axis direction toward the outside of the holder 260. Similarly, the two extra length portions 230*a* pulled out from the second housing 250 include parts extending toward the restricting walls 257 and parts extending from the former parts toward mutually opposite sides in the Y-axis direction toward the outside of the holder 260. Each extra length portion 230*a* is pulled out to the outside of the holder 260 in the Y-axis direction from the holder 260 and folded toward opposite sides across the path restricting portion 264**.

As just described, the routing path of each flexible wire 230 is restricted by routing each extra length portion **230*a* along the path restricting portion 264**.

(Movement Mode of Interlock Connector 200)

Next, a movement mode of the first housing 240 in the interlock connector 200 mounted in the connector housing 30 is described. Since a movement mode of the second housing 250 is the same as that of the first housing 240, it is not described.

Figure 14:
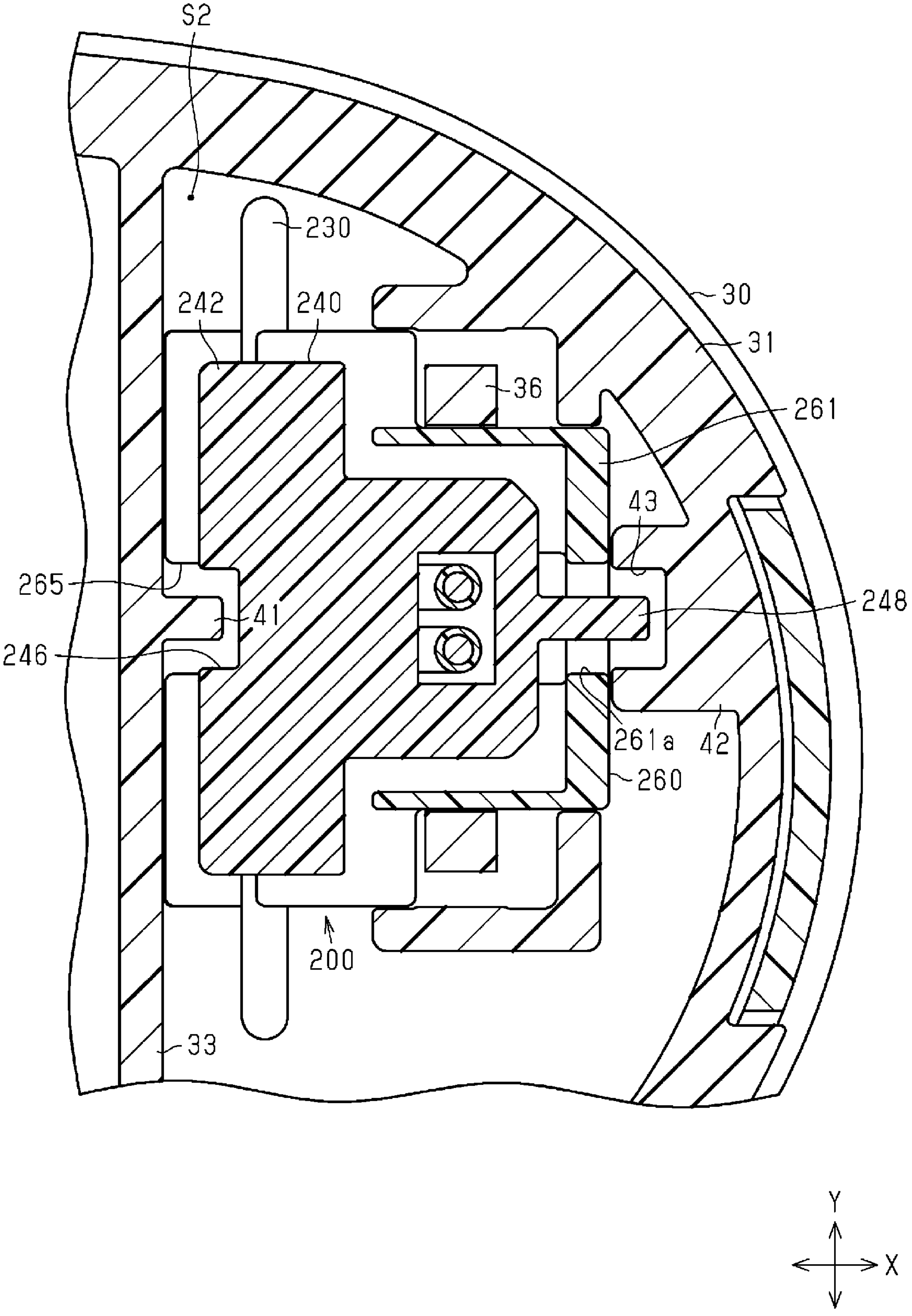
FIG. 14 is a section along 14-14 of FIG. 6.

As shown in FIG. 14, the restricting protrusion 41 of the connector housing 30 is located inside the first recess 246 of the first housing 240 and the cut 265 of the holder 260. A gap is provided between the restricting protrusion 41 and the first recess 246 in the plane direction. The size of this gap is so set that the inner surface of the first recess 246 contacts the outer surface of the restricting protrusion 41 before the first housing 240 contacts the holder 260 when the first housing 240 moves in the plane direction.

The first projection 248 of the first housing 240 is located inside the restricting recess 43 of the connector housing 30. A gap is provided in the plane direction between the first projection 248 and the restricting recess 43. The size of this gap is set such that the outer surface of the first projection 248 contacts the inner surface of the restricting recess 43 before the first housing 240 contacts the holder 260 when the first housing 240 moves in the plane direction.

From the above, movement ranges of the first and second housings 240, 250 are limited by the contact of the first and second housings 240, 250 with the connector housing 30 in the plane direction. Note that, in the single interlock connector 200, the movement ranges of the first and second housings 240, 250 are limited by the contact of the first and second housings 240, 250 with the holder 260 in the plane direction as described above.

(Configuration of Cover 70)

As shown in FIG. 6, the cover 70 covers the opening 32 of the tubular portion 31 by being inserted into the tubular portion 31 from the side of the first end part 31*a*.

Figure 15:
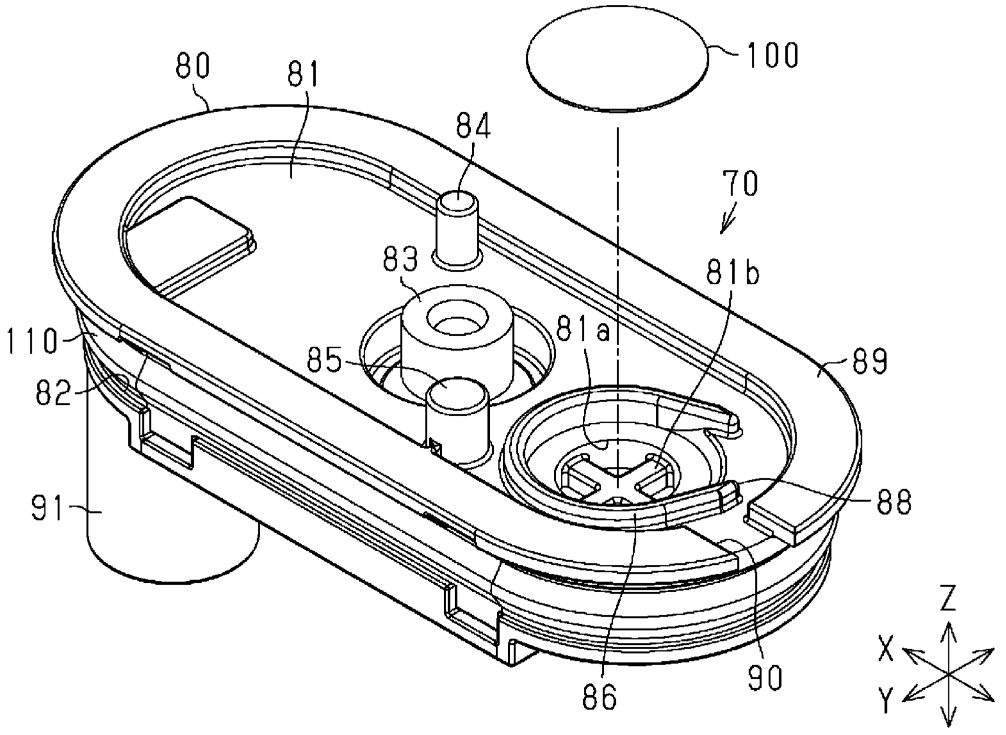
FIG. 15 is an exploded perspective view of a cover of the embodiment.

As shown in FIG. 15, the cover 70 includes a cover body 80 and a ventilation membrane 100. A resin material such as polybutylene terephthalate (PBT) can be, for example, cited as a material of the cover body 80. A porous resin material or the like can be, for example, cited as a material of the ventilation membrane 100.

The cover body 80 includes a lid portion 81 for covering the opening 32 of the tubular portion 31. The lid portion 81 has an oval shape long in the X-axis direction when viewed from the Z-axis direction.

A third accommodation groove 82 is provided over an entire periphery in the outer peripheral surface of the lid portion 81. An annular third sealing member 110 is accommodated in the third accommodation groove 82. Water is stopped in a part between the cover body 80 and the connector housing 30 by the third sealing member 110 (see FIG. 6).

The lid portion 81 includes a ventilation hole 81*a* penetrating through the lid portion 81 in the Z-axis direction. The ventilation hole 81*a* is provided at a position deviated toward one side in the X-axis direction from a central part of the lid portion 81.

The ventilation membrane 100 covers the ventilation hole 81*a* from a side opposite to the two connection terminals 10 in the Z-axis direction (see FIG. 6). The ventilation membrane 100 is circular when viewed from the Z-axis direction. A diameter of the ventilation membrane 100 is larger than that of the ventilation hole 81*a*. The ventilation membrane 100 is, for example, fixed by being welded to the lid portion 81.

The ventilation membrane 100 is configured to allow the passage of a gas such as air and inhibit the passage of a liquid such as water. A pressure difference between the inside and outside of the tubular portion 31 is moderated by the ventilation membrane 100.

An X-shaped partitioning portion 81 for partitioning the ventilation hole 81*a* is provided in the ventilation hole 81*a*. The touch of worker's fingers with the ventilation membrane 100 through the ventilation hole 81*a* is suppressed by the partitioning portion 81*b* of the ventilation hole 81*a*.

As shown in FIG. 2, the lid portion 81 includes a boss 83 projecting toward a second shell 140 to be described later. The boss 83 projects from a central part of the lid portion 81 in both the X-axis direction and Y-axis direction. The boss 83 has a hollow cylindrical shape closed on one end. The boss 83 is provided with a fastening hole, into which a screw 170 is tightened. The fastening hole is open toward a side opposite to the two connection terminals 10 in the Z-axis direction. The screw 170 is a tap screw including a washer.

The lid portion 81 includes a first support protrusion 84 and a second support protrusion 85. Each support protrusion 84, 85 projects toward the second shell 140 to be described later. The first and second support protrusions 84, 85 are located on mutually opposite sides across the boss 83 in a plane direction intersecting both the X axis and Y axis. The first support protrusion 84 is located on a side where the holding portion 47 is located when viewed from the boss 83 in the Y-axis direction.

Each support protrusion 84, 85 has a cylindrical shape. A diameter of the first support protrusion 84 is smaller than that of the second support protrusion 85.

As shown in FIG. 15, the lid portion 81 has an inner wall 86 and an outer wall 89 respectively projecting in the Z-axis direction. The inner wall 86 surrounds the outer periphery of the ventilation membrane 100. The outer wall 89 is located on an outer peripheral side of the inner wall 86 and forms the outer peripheral edge of the cover body 80. That is, the outer wall 89 includes the outer peripheral edge of the cover body 80.

End surfaces in the Z-axis direction of the inner wall 86 and the outer wall 89 are flush with each other. Note that the boss 83 and the first and second support protrusions 84, 85 described above project beyond the end surfaces in the Z-axis direction of the inner wall 86 and the outer wall 89.

The outer peripheral edge of the outer wall 89 is located further on the outer peripheral side than the opening 32 of the tubular portion 31. The outer wall 89 covers an end surface of the first end part 31*a* in the Z-axis direction (see FIG. 6).

The inner wall 86 includes an inner discharge opening 88 allowing communication between the inside and outside of the inner wall 86 in a direction orthogonal to the Z-axis direction. The outer wall 89 includes an outer discharge opening 90 allowing communication between the inside and outside of the outer wall 89 in a direction orthogonal to the Z-axis direction. The inner and outer discharge openings 88, 90 are oriented in mutually different directions. The entire inner discharge opening 88 is facing the inner peripheral surface of the outer wall 89. The entire outer discharge opening 90 is facing the outer peripheral surface of the inner wall 86.

A virtual axis extending in a communication direction of the inner discharge opening 88 is referred to as a first virtual axis L1 and a virtual axis extending in a communication direction of the outer discharge opening 90 is referred to as a second virtual axis L2 below. Further, an intersection of the first and second virtual axes L1, L2 is referred to as an intersection P.

Figure 16:
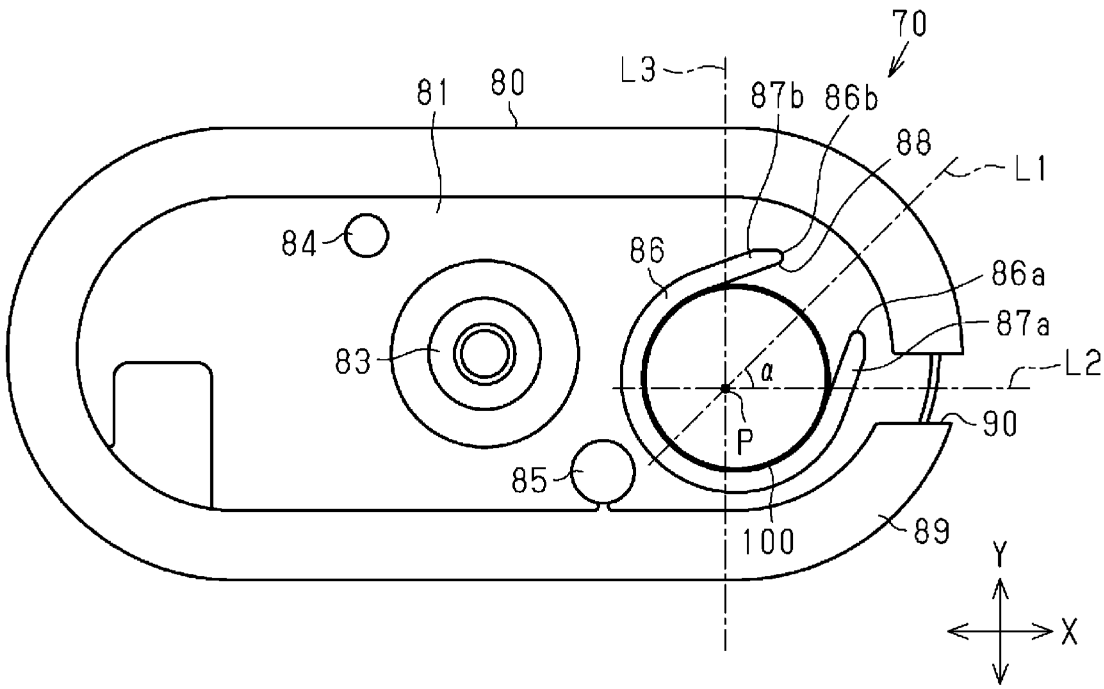
FIG. 16 is a plan view of the cover of the embodiment.

As shown in FIG. 16, the second virtual axis L2 extends in the X-axis direction. The first virtual axis L1 extends obliquely to the second virtual axis L2 in the plane direction. An angle α between the first and second virtual axes L1, L2 is an acute angle.

The entire inner discharge opening 88 is provided closer to a side where the outer discharge opening 90 is located than the intersection P in an axial direction of the second virtual axis L2, i.e. in the X-axis direction. In other words, the entire discharge opening 88 is located closer to the side where the outer discharge opening 90 is located than a third virtual axis L3 extending in the Y-axis direction and passing through the intersection P.

If the outer discharge opening 90 is oriented in a 6 o'clock direction, the inner discharge opening 88 is, for example, preferably oriented toward a region between 3 o'clock and 9 o'clock in a clockwise direction. However, a case where the entire inner discharge opening 88 is not facing the inner peripheral surface of the outer wall 89 is excluded.

The inner wall 86 has a first end edge 86*a* and a second end edge 86*b* forming the inner discharge opening 88. The first end edge 86*a* is located closer to the outer discharge opening 90 than the second end edge 86*b*.

The inner wall 86 is provided with a first extending portion 87*a* extending to include the first end edge 86*a* and a second extending portion 87*b* extending to include the second end edge 86*b*. The first and second extending portions 87*a*, 87*b* are facing each other.

A part of the inner wall 86 excluding the first and second extending portions 87*a*, 87*b* has, for example, an arcuate shape along the outer peripheral edge of the ventilation membrane 100. The first and second extending portions 87*a*, 87*b* extend, for example, linearly. The first and second extending portions 87*a*, 87*b* extend closer to each other toward the inner discharge opening 88.

The first extending portion 87*a* extends obliquely to the second virtual axis L2 to approach the outer discharge opening 90 in the axial direction of the second virtual axis L2, i.e. in the X-axis direction, toward the first end edge 86*a*.

As shown in FIGS. 6 and 13, the cover 70 includes the accommodating portion 91 projecting into the tubular portion 31 from the lid portion 81 and configured to accommodate the terminal accommodating portion 241 of the first housing 240. The accommodating portion 91 has a hollow cylindrical shape closed on one end.

The accommodating portion 91 restricts a movement of the first housing 240 in the plane direction by contacting the outer peripheral surface of the terminal accommodating portion 241 over an entire periphery.

As shown in FIG. 13, the cover terminal 92 formed from a metal plate is provided inside the accommodating portion 91. The cover terminal 92 includes two projections to be respectively inserted into the two first terminals 210. The cover terminal 92 is, for example, press-fit into the accommodating portion 91.

(Configuration of Shield Shell 120)

As shown in FIGS. 1 and 2, the shield shell 120 includes a first shell 120, the second shell 140 and the third shell 150. An iron-based or aluminum-based metal material can be, for example, cited as a material of each shell 130, 140, 150.

(Configuration of First Shell 130)

As shown in FIG. 2, the first shell 130 includes a first part 131 and a second part 135. The first part 131 covers the outer periphery of a part of the tubular portion 31 including the first end part 31*a*. The second part 135 covers the outer periphery of a part of the holding portion 47. The first and second parts 131, 135 are open toward the case 300 in the Z-axis direction.

The first part 131 includes an opening 132, into which the tubular portion 31 is inserted. The opening 132 has an oval shape long in the X-axis direction when viewed from the Z-axis direction.

The first part 131 includes two fixing projections 133 projecting toward the outer peripheral side of the opening 132. One fixing projection 133 is located on a side opposite to the second part 135 across the opening 132 in the Y-axis direction. The other fixing projection 133 is located on a side opposite to the one fixing projection 133 across the opening 132 in a plane direction intersecting both the X and Y axes. Each fixing projection 133 is provided with a screw hole 133*a* penetrating in the Z-axis direction.

The first part 131 includes two flanges 134 projecting toward the outer peripheral side of the opening 132. The two flanges 134 are provided at positions respectively corresponding to the two flanges 45 of the connector housing 30. Each flange 134 is provided with a through hole 134*a* penetrating in the Z-axis direction. The through hole 134*a* communicates with the collar 46 provided in the flange 45. As shown in FIG. 1, the connector C is fixed to the case 300 by tightening unillustrated bolts inserted through the flanges 134 and the collars 46 into screw holes 302 provided in the case 300.

As shown in FIG. 2, the second part 135 includes a projecting portion 136 projecting toward a side opposite to the holding portion 47 in the Z-axis direction. The projecting portion 136 is provided with a screw hole 136*a* penetrating in the Y-axis direction.

The first shell 130 includes two positioning protrusions 137A, 137B projecting toward the second shell 140 from an end surface in the Z-axis direction. The positioning protrusion 137A projects from the second part 135. The positioning protrusion 137B projects from a part adjacent to the aforementioned other fixing projection 133, out of the first part 131. Each positioning protrusion 137A, 137B has a cylindrical shape.

Each positioning protrusion 137A, 137B includes a cylindrical portion extending in the Z-axis direction and a truncated conical portion connected to an end part of the cylindrical portion. A cross-section area of the cylindrical portion orthogonal to the Z-axis direction is constant entirely in the Z-axis direction. A cross-sectional area of the truncated conical portion is gradually reduced with distance from the cylindrical portion in the Z-axis direction. Therefore, a tip part of each positioning protrusion 137A, 137B in a projection direction is tapered. Further, each positioning protrusion 137A, 137B has a circular tip surface extending in the plane direction.

(Configuration of Second Shell 140)

The second shell 140 is in the form of a flat plate extending in the plane direction. The second shell 140 covers the opening 32 of the tubular portion 31 and the opening 132 of the first shell 130. That is, the cover 70 is covered by the second shell 140 from a side opposite to the case 300 in the Z-axis direction.

As shown in FIG. 6, the second shell 140 is in contact with the end surfaces in the Z-axis direction of the inner wall 86 and the outer wall 89 of the cover body 80.

As shown in FIG. 2, the second shell 140 includes two bolt holes 141 respectively communicating with the two screw holes 133*a* of the first shell 130. The second shell 140 is fixed to the first shell 130 by bolts 180 inserted into the respective bolt holes 141.

The second shell 140 includes a boss insertion hole 142, into which the boss 83 of the cover 70 is inserted. A diameter of the boss insertion hole 142 is larger than that of the boss 83. The diameter of the boss insertion hole 142 is smaller than that of the washer of the aforementioned screw 170. Note that, as shown in FIG. 3, a gap is provided in the Z-axis direction between the washer and the second shell 140. The second shell 140 is prevented from being detached from the cover 70 by this washer.

As shown in FIG. 2, the second shell 140 includes a first support hole 143 and a second support hole 144, into which the first and second support protrusions 84, 85 are respectively inserted. A diameter of the first support hole 143 is larger than that of the first support protrusion 84. A diameter of the second support hole 144 is larger than that of the second support protrusion 85.

The second shell 140 includes two positioning holes 145A, 145B, into which the two positioning protrusions 137A, 137B are respectively inserted. A diameter of the positioning hole 145A is larger than that of the cylindrical portion of the positioning protrusion 137A. A diameter of the positioning hole 145B is larger than that of the cylindrical portion of the positioning protrusion 137B.

The second shell 140 is positioned at a position where the bolt holes 141 overlap the entire screw holes 133*a* in the Z-axis direction by inserting the positioning protrusions 137A, 137B into the positioning holes 145A, 145B.

Figure 17:
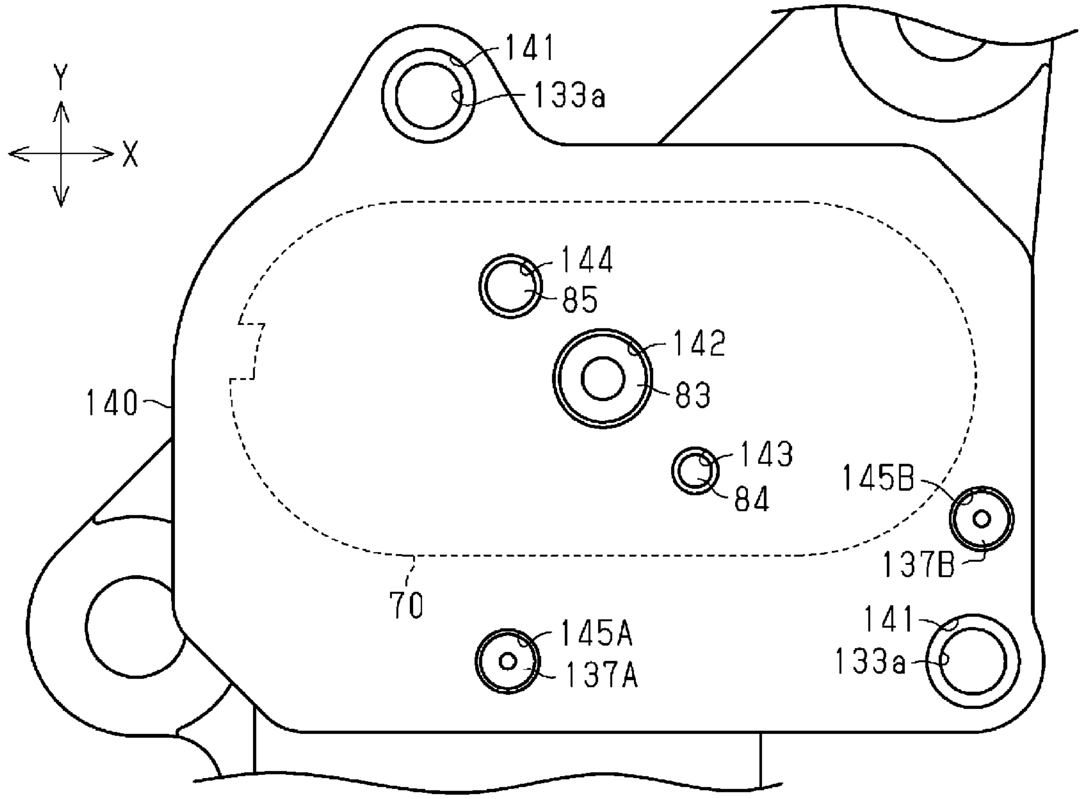
FIG. 17 is a plan view of the connector of the embodiment.

From the above, as shown in FIG. 17, a gap is provided over the entire periphery of the boss 83 between the outer surface of the boss 83 and the inner surface of the boss insertion hole 142. A gap is provided over the entire periphery of the first support protrusion 84 between the outer surface of the first support protrusion 84 and the inner surface of the first support hole 143. A gap is provided over the entire periphery of the second support protrusion 85 between the outer surface of the second support protrusion 85 and the inner surface of the second support hole 144. A gap is provided over the entire periphery of the positioning protrusion 137A between the outer surface of the positioning protrusion 137A and the inner surface of the positioning hole 145A. A gap is provided over the entire periphery of the positioning protrusion 137B between the outer surface of the positioning protrusion 137B and the inner surface of the positioning hole 145B. Therefore, in a state not fixed to the first shell 130, the second shell 140 is mounted loosely movably in the plane direction with respect to the cover 70 within the ranges of these gaps.

(Behavior of Second Shell 140)

In the connector C, the cover 70 having the second shell 140 mounted thereon may be attached to or detached from the connector housing 30 together with the second shell 140.

Next, the behavior of the second shell 140 in a state mounted on the cover 70 and not fixed to the first shell 130 is described with reference to FIGS. 18 to 21. In FIGS. 18 to 21, the screw 170 is not shown for the sake of convenience.

Figure 18:
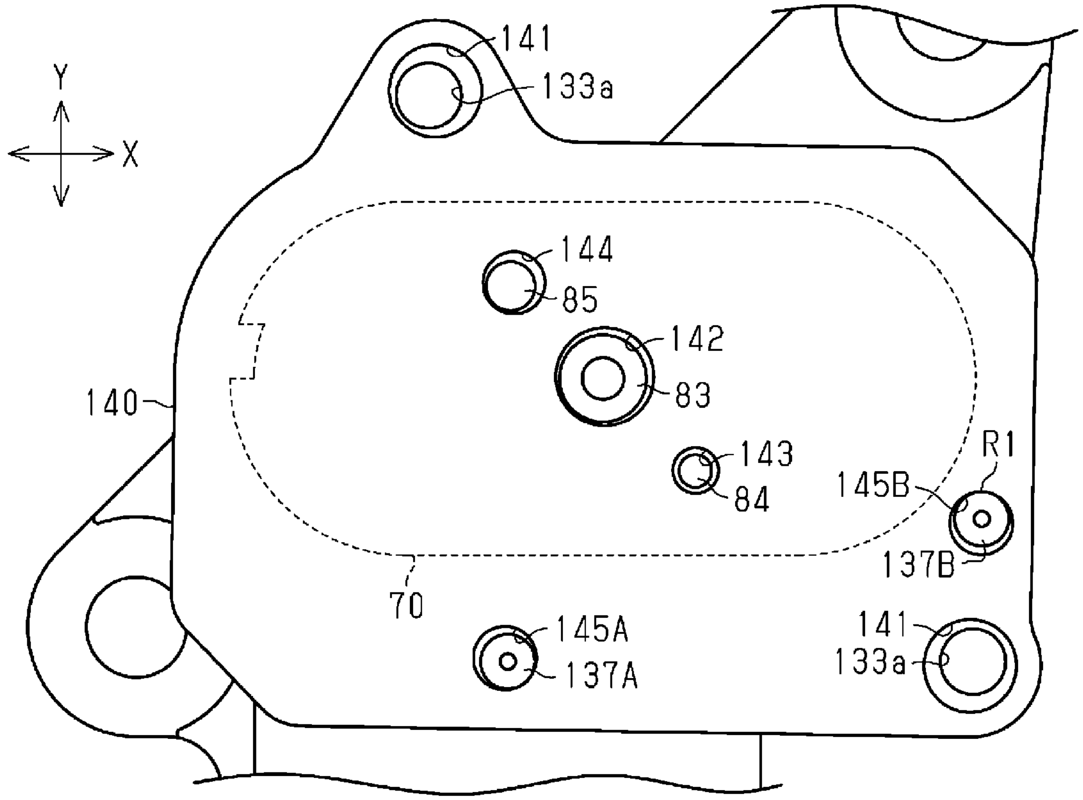
FIG. 18 is a plan view of the connector of the embodiment.
Figure 19:
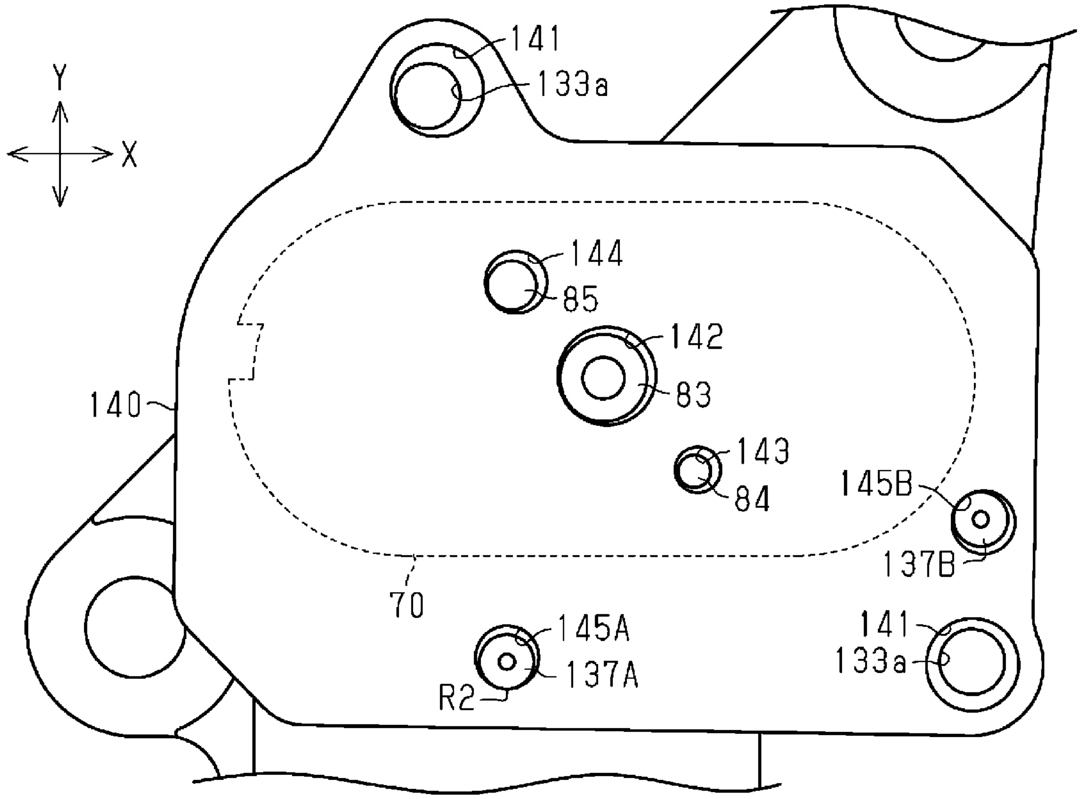
FIG. 19 is a plan view of the connector of the embodiment.

In FIGS. 18 and 19, the second shell 140 in a state where the positioning protrusions 137A, 137B are respectively inserted in the positioning holes 145A, 145B is shown.

Figure 20:
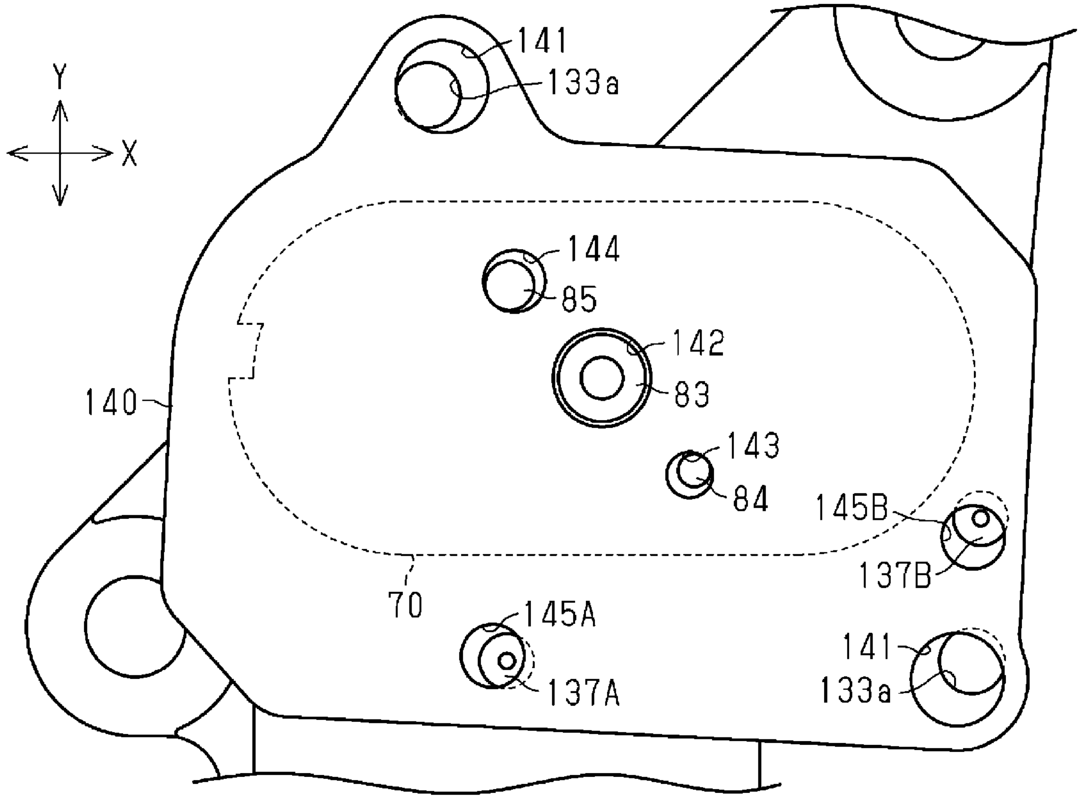
FIG. 20 is a plan view of the connector of the embodiment.
Figure 21:
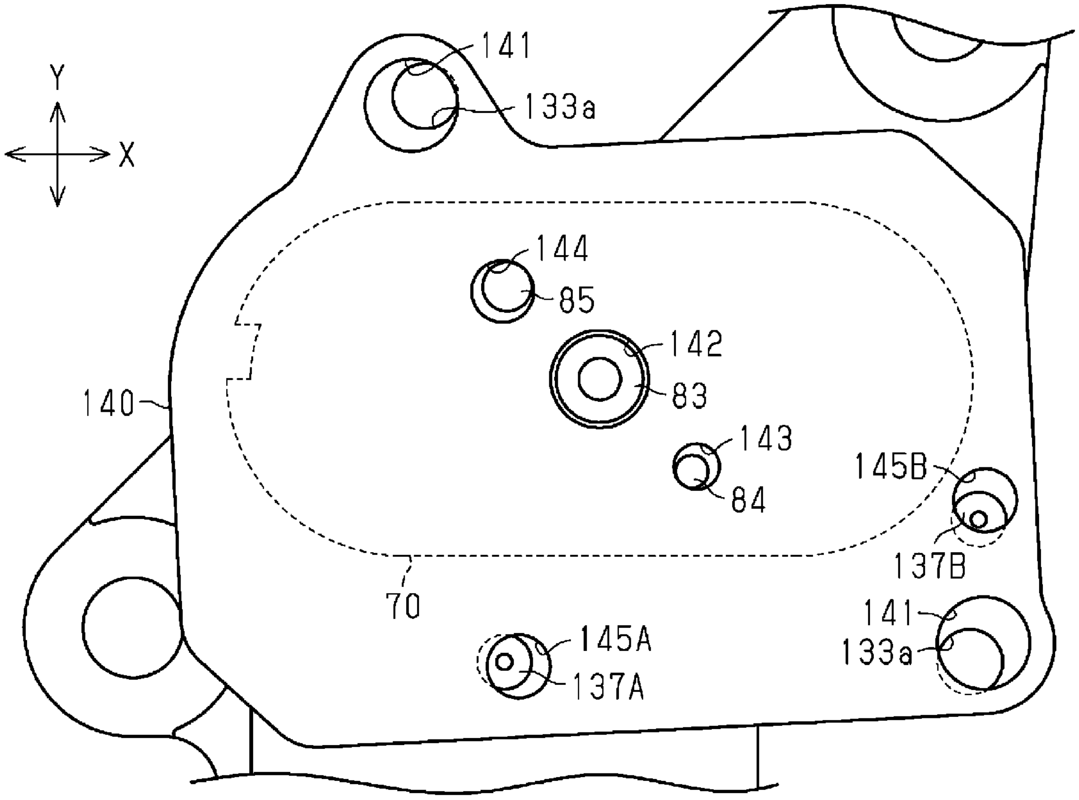
FIG. 21 is a plan view of the connector of the embodiment.

In FIGS. 20 and 21, the second shell 140 in a state immediately before the positioning protrusions 137A, 137B are respectively inserted into the positioning holes 145A, 145B is shown. Note that the position of the cover 70 in the plane direction in FIGS. 20 and 21 is a proper position with respect to the connector housing 30, i.e. a position where the cover 70 can be inserted into the tubular portion 31.

In the following description, a direction of the second support protrusion 85 when viewed from the positioning protrusion 137A in the Y-axis direction is referred to as a 12 o'clock direction.

If the second shell 140 rotates clockwise about a center of rotation R1 as shown in FIG. 18, the outer surfaces of the positioning protrusions 137A, 137B and the inner surfaces of the positioning holes 145A, 145B respectively contact, whereby the rotation of the second shell 140 is stopped. The center of rotation R1 is a contact point of the outer surface of the positioning protrusion 137B and the inner surface of the positioning hole 145B at a 12 o'clock position. With the rotation of the second shell 140 stopped in this way, the aforementioned gaps are respectively provided around the outer periphery of the boss 83, that of the first support protrusion 84 and that of the second support protrusion 85. Therefore, the second shell 140 does not contact the cover 70 in the plane direction. At this time, the respective bolt holes 141 overlap the entire screw holes 133*a* in the Z-axis direction. Thus, the bolts 180 can be inserted into the bolt holes 141 and the screw holes 133*a*.

If the second shell 140 rotates clockwise about a center of rotation R2 as shown in FIG. 19, the outer surfaces of the positioning protrusions 137A, 137B and the inner surfaces of the positioning holes 145A, 145B respectively contact, whereby the rotation of the second shell 140 is stopped. The center of rotation R2 is a contact point of the outer surface of the positioning protrusion 137A and the inner surface of the positioning hole 145A at a 6 o'clock position. With the rotation of the second shell 140 stopped in this way, the aforementioned gaps are respectively provided around the outer periphery of the boss 83, that of the first support protrusion 84 and that of the second support protrusion 85. Therefore, the second shell 140 does not contact the cover 70 in the plane direction. At this time, the respective bolt holes 141 overlap the entire screw holes 133*a* in the Z-axis direction. Thus, the bolts 180 can be inserted into the bolt holes 141 and the screw holes 133*a*.

Although not shown, even if the second shell 140 rotates counterclockwise about the center of rotation R1, R2, the second shell 140 does not contact the cover 70 in the plane direction. This applies also when the second shell 140 parallelly moves in the plane direction with respect to the cover 70.

As shown in FIG. 20, the second shell 140 loosely moves in the plane direction with respect to the cover 70 in a state where the positioning protrusions 137A, 137B are not respectively inserted in the positioning holes 145A, 145B. If the second shell 140 rotates clockwise about an axis of the boss 83, the outer surfaces of the respective support protrusions 84, 85 and the inner surfaces of the respective support holes 143, 144 contact, whereby the rotation of the second shell 140 is stopped. With the rotation of the second shell 140 stopped in this way, the positioning holes 145A, 145B respectively overlap the entire tip surfaces of the positioning protrusions 137A, 137B in the Z-axis direction. Thus, the insertion of the positioning protrusions 137A, 137B into the positioning holes 145A, 145B is guided by the truncated conical portions of the positioning protrusions 137A, 137B.

Even if the second shell 140 rotates counterclockwise about the axis of the boss 83 and the rotation thereof is stopped as shown in FIG. 21, the positioning holes 145A, 145B respectively overlap the entire tip surfaces of the positioning protrusions 137A, 137B in the Z-axis direction. Thus, the insertion of the positioning protrusions 137A, 137B into the positioning holes 145A, 145B is guided by the truncated conical portions of the positioning protrusions 137A, 137B.

(Configuration of Third Shell 150)

As shown in FIG. 2, the third shell 150 has a tubular shape extending in the Y-axis direction. The third shell 150 covers a part of the holding portion 47 not covered by the second part 135.

The third shell 150 includes a projecting portion 151 projecting toward the side opposite to the holding portion 47 in the Z-axis direction. The projecting portion 151 is provided with a through hole 151*a* penetrating in the Y-axis direction. The third shell 150 is fixed to the first shell 130 by tightening a bolt 160 inserted through the through hole 151*a* into the screw hole 136*a* of the first shell 130.

Although not shown, a braided member made of metal for collectively covering the two wires 20 is mounted on the outer peripheral surface of the third shell 150 by a crimp ring.

Functions of this embodiment are described.

The first housing 240 moves in the plane direction with respect to the holder 260 fixed to the connector housing 30 by the fixing portion 35. By accommodating such a first housing 240 into the accommodating portion 91, a movement of the first housing 240 in the plane direction is restricted. Thus, the cover terminal 92 and the first terminals 210 are aligned. Thus, a simple configuration of providing the accommodating portion 91 in the cover body 80 of the cover 70 can be adopted for the above alignment.

Effects of this embodiment are described.

(1) The connector C is provided with the two connection terminals 10, the two wires 20, the connector housing 30, the cover 70 and the interlock connector 200. The cover 70 includes the cover terminal 92 and the accommodating portion 91 in which the cover terminal 92 is to be arranged. The interlock connector 200 includes the two first terminals 210, the two second terminals 220, the two flexible wires 230, the first housing 240, the second housing 250 and the holder 260. The holder 260 holds each of the first and second housings 240, 250 movably in the plane direction. Each of the two flexible wires 230 includes the extra length portion 230*a* allowing movements of the first and second housings 240, 250 in the plane direction. The connector housing 30 includes the fixing portion 35 for fixing the holder 260 inside the tubular portion 31.

According to this configuration, the complication of the configuration of the cover 70 can be suppressed since the aforementioned functions are achieved.

Further, according to the above configuration, the first and second housings 240, 250 respectively move independently of each other in the plane direction with respect to the holder 260 fixed to the connector housing 30 by the fixing portion 35. Thus, the alignment of the cover terminal 92 and the first terminals 210 and the alignment of the standby terminals 330 and the second terminals 220 are individually performed. In this way, even if the standby terminals 330 and the second terminals 220 are aligned by moving the second housing 250, the first housing 240 does not move according to this alignment. As a result, the worker can connect the cover terminal 92 and the first terminals 210 without considering the positions of the second terminals 220. Therefore, the cover 70 can be easily mounted on the connector housing 30.

(2) The connector housing 30 includes the second partition wall 34 partitioning the inside of the tubular portion 31 in the Z-axis direction. The second partition wall 34 includes the insertion hole 34*a*, into which the first housing 240 of the interlock connector 200 is inserted. The fixing portion 35 includes the engaging pieces 36 cantilevered from the second partition wall 34 in the Z-axis direction and configured to be resiliently deformable. The engaging piece 36 includes the engaging claw 37 to be engaged with the holder 260.

According to this configuration, the interlock connector 200 can be arranged inside the tubular portion 31 by inserting the interlock connector 200 into the insertion hole 34*a* and fixing the holder 260 by the engaging pieces 36. Therefore, the fixing portion 35 can be easily realized.

(3) The movement restricting portion 40 restricts movements of the first and second housings 240, 250 in the plane direction by contacting the first and second housings 240, 250 when the first and second housings 240, 250 move in the plane direction.

According to this configuration, a movement of each housing 240, 250 is restricted by the contact of each housing 240, 250 and the movement restricting portion 40. Thus, an excessive movement of each housing 240, 250 with respect to the holder 260 is suppressed. Therefore, the alignment of the cover terminal 92 and the first terminals 210 and that of the standby terminals 330 and the second terminals 220 can be easily performed.

(4) A movement of the first housing 240 in the plane direction is restricted by the contact of the outer surface of the first projection 248 with the inner surface of the restricting recess 43 and the contact of the inner surface of the first recess 246 with the outer surface of the restricting protrusion 41 when the first housing 240 moves in the plane direction. A movement of the second housing 250 in the plane direction is restricted by the contact of the outer surface of the second projection 258 with the inner surface of the restricting recess 43 and the contact of the inner surface of the second recess 256 with the outer surface of the restricting protrusion 41 when the second housing 250 moves in the plane direction.

According to this configuration, the configuration of the movement restricting portion 40 can be easily realized.

(5) The interlock connector 200 includes the resilient member 290 and to be held in contact with the inner peripheral surface of the accommodating portion 91 by being mounted on the outer peripheral surface of the first housing 240.

According to this configuration, since the resilient member 290 contacts the inner surface of the accommodating portion 91, the vibration of the first housing 240 with respect to the accommodating portion 91 can be suppressed. In this way, for example, when the connector C vibrates, it can be suppressed that the cover terminal 92 and the first terminals 210 are caused to slide by this vibration to be worn.

(6) The first and second housings 240, 250 are provided side by side in the Z-axis direction.

According to this configuration, an increase in the size of the interlock connector 200 in the plane direction can be suppressed. Therefore, an increase in the size of the interlock connector 200 and, consequently, an increase in the size of the connector C can be suppressed.

(7) The connector C is provided with the shield shell 120. The shield shell 120 includes the first shell 130 and the second shell 140. The cover 70 includes the first and second support protrusions 84, 85. The first shell 130 includes the positioning protrusions 137A, 137B and the screw holes 133*a*. The second shell 140 includes the first and second support holes 143, 144, the positioning holes 145A, 145B and the bolt holes 141. The second shell 140 is positioned at the position where the bolt holes 141 overlap the entire screw holes 133*a* in the Z-axis direction by inserting the positioning protrusions 137A, 137B into the positioning holes 145A, 145B.

According to this configuration, the bolt holes 141 and the entire screw holes 133*a* overlap in the Z-axis direction by respectively inserting the positioning protrusions 137A, 137B into the positioning holes 145A, 145B. In this way, the worker can easily align the bolt holes 141 and the screw holes 133*a* by respectively inserting the positioning protrusions 137A, 137B into the positioning holes 145A, 145B.

Therefore, workability during the manufacturing of the connector C can be improved.

Modifications

This embodiment can be modified and carried out as follows. This embodiment and the following modifications can be carried out in combination without technically contradicting each other.

Figure 22:
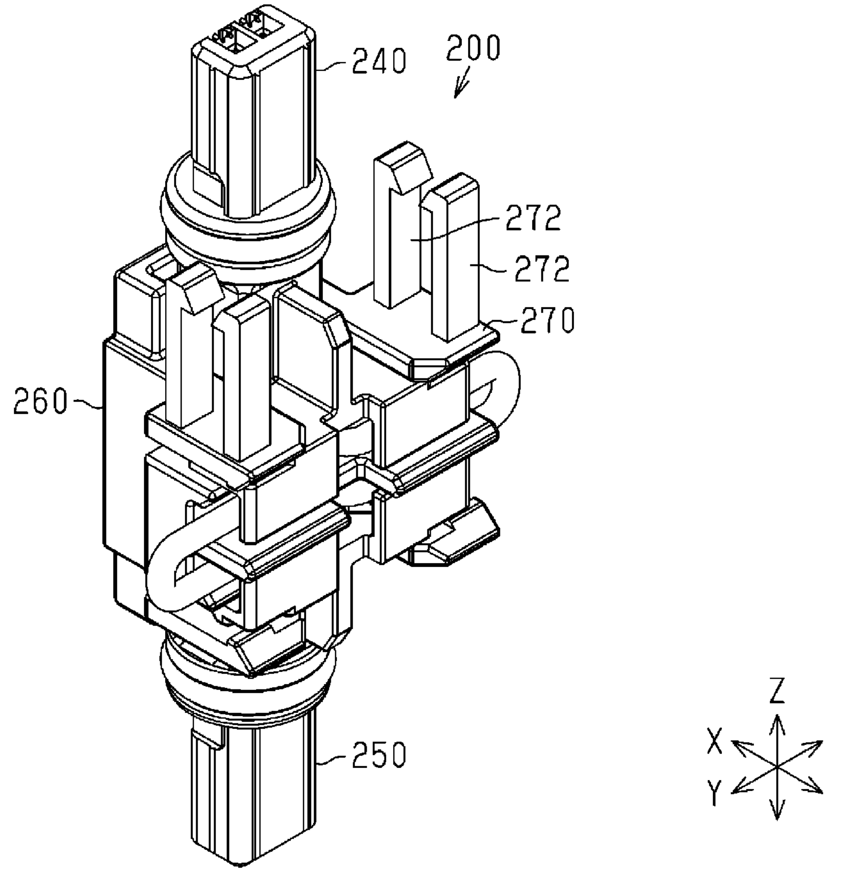
FIG. 22 is a perspective view of an interlock connector of a modification.
Figure 23:
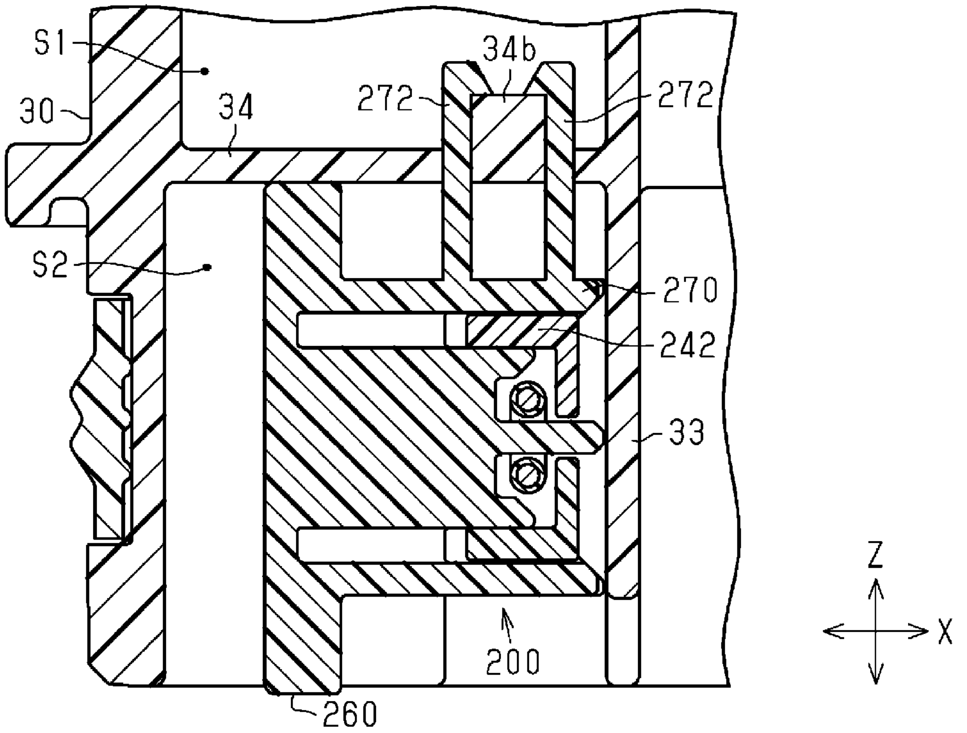
FIG. 23 is a section of a connector of the modification.

- The shield shell 120 may be omitted from the connector C.
- The holder 260 may hold only the first housing 240 movably in the plane direction. That is, the second housing 250 may be fixed immovably with respect to the holder 260.
- The first and second housings 240, 250 may be provided at mutually different positions in the Z-axis direction. In this case, the shape of the holder 260 may not be plane-symmetrical.
- The resilient member 290 may be omitted from the interlock connector 200.
- Either one of the first projection 248 and the first recess 256 may be omitted from the first housing 240, and the corresponding restricting recess 43 or restricting protrusion 41 may be omitted from the connector housing 30. This modification can be similarly applied also to the second housing 250.
- The rib 42 may be omitted from the connector housing 30. In this case, the restricting recess 43 may be formed by a groove provided in the inner wall of the tubular portion 31.
- The movement restricting portion 40 may be omitted from the connector housing 30. Even in this case, a movement of the first housing 240 in the plane direction is restricted by the contact of the outer surface of the first projection 248 with the inner surface of the first restricting hole 261*a* of the holder 260. This applies also to the second housing 250.
- The fixing portion 35 may include one engaging piece 36 or may include three or more engaging pieces 36.
- As shown in FIGS. 22 and 23, the holder 260 may include a pair of claw portions 272 projecting in the Z-axis direction from each first holding portion 270 and penetrating through the second partition wall 34. In this modification, the second partition wall 34 is provided with engaging projections 34*b* to be engaged with the pairs of claw portions 272. By the engagement of the pairs of claw portions 272 and the engaging projections 34*b*, the holder 260 is fixed to the connector housing 30. The engaging projection 34*b* corresponds to a "fixing portion." In this case, the engaging pieces 36 may be omitted from the connector housing 30.
- The extra length portion 230*a* may not be pulled out to the outside of the holder 260 from the holder 260. In this case, the extra length portion 230*a* may be accommodated in a space between the holder 260 and each housing 240, 250. At this time, the extra length portion 230*a* is preferably longer than a shortest distance between the first terminal 210 and the second terminal 220 in the Z-axis direction.
- Each terminal 210, 220 may be a male terminal. In this case, each of the cover terminal 92 and the standby terminals 330 may be a female terminal.

The accommodating portion 91 of the cover 70 may be movably accommodated in the first space S1 of the tubular portion 31.

As shown in FIG. 13, the two engaging pieces 36 of the fixing portion 35 may sandwich and fix the holder 260 in the Y-axis direction.

LIST OF REFERENCE NUMERALS

α angle
C connector
L1 first virtual axis
L2 second virtual axis
L3 third virtual axis
M electrical device (connection target)
P intersection
R1 center of rotation
R2 center of rotation
S1 first space
S2 second space
10 connection terminal
11 first extending portion
12 second extending portion
13 third extending portion
13*a* through hole
14 wire connecting portion
20 wire
21 core wire
22 insulation coating
30 connector housing
31 tubular portion
31*a* first end part
31*b* second end part
32 opening
33 first partition wall
34 second partition wall (partition wall)
34*a* insertion hole
34*b* engaging projection
35 fixing portion
36 engaging piece
37 engaging claw
40 movement restricting portion
41 restricting protrusion
42 rib
43 restricting recess
44 first accommodation groove
45 flange
46 collar
47 holding portion
48 second accommodation groove
50 first sealing member
60 second sealing member
70 cover
80 cover body
81 lid portion
81*a* ventilation hole
81*b* partitioning portion
82 third accommodation groove
83 boss
84 first support protrusion
85 second support protrusion
86 inner wall
86*a* first end edge
86*b* second end edge
87*a* first extending portion
87*b* second extending portion
88 inner discharge opening
89 outer wall
90 outer discharge opening
91 accommodating portion

92 cover terminal
100 ventilation membrane
110 third sealing member
120 shield shell
130 first shell
131 first part
132 opening
133 fixing projection
133*a* screw hole
134 flange
134*a* through hole
135 second part
136 projecting portion
136*a* screw hole
137A positioning protrusion
137B positioning protrusion
140 second shell
141 bolt hole
142 boss insertion hole
143 first support hole
144 second support hole
145A positioning hole
145B positioning hole
150 third shell
151 projecting portion
151*a* through hole
160 bolt
170 screw
180 bolt
200 interlock connector
210 first terminal
220 second terminal
230 flexible wire
230*a* extra length portion
231 core wire
232 insulation coating
240 first housing
241 terminal accommodating portion
241*a* accommodation groove
242 first held portion
243 projection
244 dent
245 restricting rib
246 first recess (recess)
247 restricting wall
248 first projection (projection)
250 second housing
251 terminal accommodating portion
251*a* accommodation groove
252 second held portion
253 projection
254 dent
255 restricting rib
256 second recess
257 restricting wall
258 second projection
260 holder
261 base portion
261*a* first restricting hole
261*b* second restricting hole
262 partitioning portion
263 escaping recess
264 path restricting portion
265 cut
266 protruding portion
270 first holding portion
271 restricting claw
272 claw portion
280 second holding portion
281 restricting claw
290 resilient member
300 case
301 insertion hole
302 screw hole
310 mating terminal
320 standby connector
330 standby terminal

What is claimed is:

1. A connector to be electrically connected to a connection target, comprising:

a plurality of connection terminals parallel to each other;

a plurality of wires to be respectively connected to the plurality of connection terminals;

a connector housing including a tubular portion provided with an opening for exposing end parts of the plurality of connection terminals;

a cover for covering the opening by being inserted into the tubular portion; and an interlock connector provided inside the tubular portion, the interlock connector electrically detecting attachment and detachment of the cover to and from the connector housing, an end part of each of the plurality of connection terminals being provided with a through hole penetrating in an axial direction of the tubular portion, a bolt being inserted through the through hole, the cover including a cover terminal and an accommodating portion, the cover terminal being arranged in the accommodating portion, the interlock connector including:

a plurality of first terminals to be electrically connected to the cover terminal;

a plurality of second terminals to be electrically connected to a standby terminal provided in the connection target;

a plurality of flexible wires having flexibility, the flexible wires respectively electrically connecting the plurality of first terminals and the plurality of second terminals;

a first housing for holding the plurality of first terminals, the first housing including a terminal accommodating portion and a first held portion held by the holder;

a second housing for holding the plurality of second terminals; and a holder for holding the first housing movably in a plane direction orthogonal to the axial direction, the holder covering the plurality of flexible wires, each of the plurality of flexible wires including an extra length portion allowing a movement of the first housing in the plane direction with respect to the holder, the accommodating portion of the cover accommodating the terminal accommodating portion of the first housing and restricting a movement of the first housing in the plane direction, wherein the interlock connector further includes an annular resilient member mounted on an outer peripheral surface of the terminal accommodating portion, the resilient member being held in contact with an inner peripheral surface of the accommodating portion to suppress vibration of the first housing with respect to the accommodating portion, and the connector housing including a fixing portion for fixing the holder inside the tubular portion.

2. The connector of claim 1, wherein:

the connector housing includes a partition wall for partitioning inside of the tubular portion in the axial direction, the partition wall includes an insertion hole, the interlock connector being inserted through the insertion hole, the fixing portion includes an engaging piece cantilevered from the partition wall in the axial direction and configured to be resiliently deformable, and the engaging piece includes an engaging claw to be engaged with the holder.

3. The connector of claim 1, wherein:

the connector housing includes a movement restricting portion facing the first held portion of the first housing in the plane direction inside the tubular portion, and the movement restricting portion restricts a movement of the first housing in the plane direction by contacting the first held portion when the first housing moves in the plane direction.

4. The connector of claim 3, wherein:

the first held portion includes a first projection projecting toward an inner wall of the tubular portion and a first recess open toward the inner wall of the tubular portion, the movement restricting portion includes a restricting recess for accommodating the first projection and a restricting protrusion to be accommodated into the first recess, and a movement of the first housing in the plane direction is restricted by contact of an outer surface of the first projection with an inner surface of the restricting recess and contact of an inner surface of the first recess with an outer surface of the restricting protrusion when the first housing moves in the plane direction.

5. The connector of claim 1, wherein the terminal accommodating portion includes an accommodation groove provided over an entire periphery in an outer peripheral surface thereof, and the resilient member is accommodated in the accommodation groove.

6. The connector of claim 1, wherein the first housing and the second housing are provided side by side in the axial direction.

7. The connector of claim 1, wherein the holder holds each of the first housing and the second housing movably in the plane direction.

8. The connector of claim 1, further comprising a shield shell made of metal for covering an outer periphery of the connector housing, wherein:

the shield shell includes a first shell including an opening, the tubular portion being inserted into the opening, the first shell covering an outer periphery of the tubular portion, and a second shell mounted loosely movably with respect to the cover, the second shell being fixed to the first shell, the second shell covering the opening of the first shell, the cover includes a support protrusion projecting toward the second shell, the first shell includes a positioning protrusion projecting toward the second shell and a screw hole facing the second shell, and the second shell includes a support hole, the support protrusion being inserted into the support hole, a positioning hole, the positioning protrusion being inserted into the positioning hole, and a bolt hole, a bolt to be screwed into the screw hole being inserted through the bolt hole, and is positioned at a position where the bolt hole overlaps the entire screw hole in the axial direction by inserting the positioning protrusion into the positioning hole.

* * * * *